United States Patent
Harada et al.

(10) Patent No.: US 12,432,703 B2
(45) Date of Patent: Sep. 30, 2025

(54) TERMINAL

(71) Applicant: NTT DOCOMO, INC., Tokyo (JP)

(72) Inventors: Hiroki Harada, Tokyo (JP); Daisuke Kurita, Tokyo (JP); Satoshi Nagata, Tokyo (JP); Lihui Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 372 days.

(21) Appl. No.: 17/633,141

(22) PCT Filed: Aug. 7, 2019

(86) PCT No.: PCT/JP2019/031253
§ 371 (c)(1),
(2) Date: Feb. 4, 2022

(87) PCT Pub. No.: WO2021/024440
PCT Pub. Date: Feb. 11, 2021

(65) Prior Publication Data
US 2022/0330239 A1    Oct. 13, 2022

(51) Int. Cl.
*H04W 72/04* (2023.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC ... H04W 72/0446; H04W 72/23; H04W 8/24; H04W 74/006; H04W 74/08
See application file for complete search history.

(56) References Cited

U.S. PATENT DOCUMENTS

| | | | |
|---|---|---|---|
| 2018/0343653 A1* | 11/2018 | Guo | H04W 72/046 |
| 2019/0149365 A1 | 5/2019 | Chatterjee et al. | |
| 2020/0077433 A1* | 3/2020 | Lin | H04W 72/1263 |
| 2021/0168849 A1* | 6/2021 | Oh | H04W 72/23 |
| 2021/0226732 A1* | 7/2021 | Yeo | H03M 13/6306 |
| 2021/0377993 A1* | 12/2021 | Ayaz | H04L 5/0094 |
| 2022/0077969 A1* | 3/2022 | Kim | H04L 1/1861 |
| 2022/0191839 A1* | 6/2022 | Ying | H04W 72/23 |

OTHER PUBLICATIONS

International Search Report issued in PCT/JP2019/031253, mailed on Mar. 17, 2020 (3 pages).
Written Opinion of the International Searching Authority PCT/JP2019/031253, mailed on Mar. 17, 2020 (3 pages).
(Continued)

*Primary Examiner* — Luat Phung
(74) *Attorney, Agent, or Firm* — Osha Bergman Watanabe & Burton LLP

(57) ABSTRACT

A terminal including: a reception unit configured to receive, from a base station apparatus, control information designating a number of continuous slots to which a physical uplink shared channel is assigned, or a number of continuous physical uplink shared channels; and a transmission unit configured, when LBT succeeds at any one of a plurality of candidate start positions in a slot of continuous slots to which the physical uplink shared channel is assigned, to start data transmission by the physical uplink shared channel from a candidate start position at which LBT succeeds.

5 Claims, 15 Drawing Sheets

(56) References Cited

OTHER PUBLICATIONS

Qualcomm Incorporated; "Enhancements to Scheduling and HARQ operation for NR-U"; 3GPP TSG RAN WG1 Meeting #97, R1-1907263; Reno, USA, May 13-17, 2019 (14 pages).

MediaTek Inc. "UL Signals and Channels for NR-U operation"; 3GPP TSG RAN WG1 Ad-Hoc Meeting 1901, R1-1900185; Taipei, Taiwan, Jan. 21-25, 2019 (16 pages).

3GPP TS 38.331 V15.6.0; "3rd Generation Partnership Project; Technical Specification Group Radio Access Network; NR; Radio Resource Control (RRC) protocol specification (Release 15)"; Jun. 2019 (519 pages).

3GPP TS 38.212 V15.6.0; "3rd Generation Partnership Project; Technical Specification Group Radio Access Network; NR; Multiplexing and channel coding (Release 15)"; Jun. 2019 (101 pages).

3GPP TS 38.213 V15.6.0; "3rd Generation Partnership Project; Technical Specification Group Radio Access Network; NR; Physical layer procedures for control (Release 15)"; Jun. 2019 (107 pages).

3GPP TS 38.214 V15.6.0; "3rd Generation Partnership Project; Technical Specification Group Radio Access Network; NR; Physical layer procedures for data (Release 15)"; Jun. 2019 (105 pages).

Office Action issued in Chinese Application No. 201980098998.4, mailed May 31, 2024 (23 pages).

Office Action in the counterpart Chinese Application No. 201980098998.4, mailed May 25, 2023 (19 pages).

Office Action issued in counterpart Japanese Patent Application No. 2021-538638 mailed on Jul. 2, 2024 (5 pages).

Office Action in Japanese Application No. 2021-538638, mailed Jan. 16, 2024 (5 pages).

Huawei; "Feature lead summary of HARQ enhancements for NR-U"; 3GPP TSG RAN WG1 Meeting #97, R1-1907652; Reno, USA, May 13-17, 2019 (24 pages).

Nokia, Nokia Shanghai Bell; "Summary of Thursday offline discussion on PUSCH enhancements for NR eURLLC (AI 7.2.6.3)"; 3GPP TSG-RAN WG1 Meeting #97, R1-1907861; Reno, Nevada, US, May 13-17, 2019 (30 pages).

Office Action in Japanese Application No. 2021-538638, mailed Oct. 3, 2023 (7 pages).

* cited by examiner

FIG.4

```
PUSCH-TimeDomainResourceAllocationList ::=   SEQUENCE (SIZE(1..maxNrofUL-Allocations)) OF PUSCH-TimeDomainResourceAllocation PUSCH-TimeDomainResourceAllocation ::= SEQUENCE {
    k2                        INTEGER(0..32)              OPTIONAL,     -- Need S
    mappingType               ENUMERATED {typeA, typeB},
    startSymbolAndLength      INTEGER (0..127)
}
```

TERMINAL

TECHNICAL FIELD

The present invention relates to a terminal in a wireless communication system.

BACKGROUND ART

In NR (New Radio) (also referred to as "5G"), a successor system to the Long Term Evolution (LTE), technologies that satisfy requirements such as high capacity systems, high data transmission rate, low delay, simultaneous connection of multiple terminals, low cost, and power saving are being considered.

In addition, the existing LTE system supports use of frequency bands different from licensed bands licensed to telecom carriers (operators), (i.e., unlicensed bands, unlicensed carriers, and unlicensed CC) in order to expand the frequency bands. Examples of unlicensed bands include a 2.4-GHz band, a 5-GHz band, and a 6-GHz band where Wi-Fi (registered trademark) or Bluetooth (registered trademark) can be used.

Specifically, Rel.13 supports Carrier Aggregation (CA), which integrates a carrier (CC) of a licensed band and a carrier (CC) of an unlicensed band. Like this, communication using the unlicensed band with the license band is called License-Assisted Access (LAA).

In a wireless communication system that communicates using an unlicensed band with a license band, a base station apparatus (downlink) and a user terminal (uplink) perform channel sensing (carrier sensing) to check presence or absence of transmission by other devices (e.g., base station apparatus, user terminal, Wi-Fi device, etc.) before transmission of data in the unlicensed band. As a result of the sensing, when it is confirmed that there is no transmission by other devices, a transmission opportunity can be obtained and transmission can be performed. This operation is called LBT (Listen Before Talk). Also, in NR, the system that supports the unlicensed band is called an NR-U system.

PRIOR ART DOCUMENTS

Non-Patent Documents

[Non-Patent Document 1] 3GPP TS 38.331 V15.6.0 (2019-06)
[Non-Patent Document 2] 3GPP TS 38.212 V15.6.0 (2019-06)
[Non-Patent Document 3] 3GPP TS 38.213 V15.6.0 (2019-06)
[Non-Patent Document 4] 3GPP TS 38.214 V15.6.0 (2019-06)

SUMMARY OF INVENTION

Problem to be Solved by the Invention

In the NR-U system, it is assumed that a multi-TTI grant is used to schedule a PUSCH over multiple slots.

In a user terminal, for example, a multi-TTI grant could be used to perform scheduling for multiple minislots across multiple slots in order to provide an LBT opportunity in fine granularity. However, in this method, the user terminal needs to perform data transmission by a PUSCH in multiple minislots if LBT is successful, which is inefficient.

The present invention has been made in view of the above points, and an object of the present invention is to provide a technique that enables a user terminal to perform efficient transmission while keeping LBT opportunities with appropriate granularities.

Means for Solving Problems

According to the disclosed technique, there is provided a terminal including:

a reception unit configured to receive, from a base station apparatus, control information designating a number of continuous slots to which a physical uplink shared channel is assigned, or a number of continuous physical uplink shared channels; and a transmission unit configured, when LBT succeeds at any one of a plurality of candidate start positions in a slot of continuous slots to which the physical uplink shared channel is assigned, to start data transmission by the physical uplink shared channel from a candidate start position at which LBT succeeds.

Effects of the Invention

According to the disclosed technique, a technique that enables a user terminal to perform efficient transmission while keeping LBT opportunities with appropriate granularities is provided.

BRIEF DESCRIPTION OF DRAWINGS

FIG. 4 is a diagram showing an example of an RRC message in a TDRA;

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, existing techniques are used as appropriate. The existing technology is, for example, an existing NR. The present invention is applicable not only to NR but also to any wireless communication system.

In embodiments of the present invention, the duplex method to be used may be a TDD (Time Division Duplex) method, a FDD (Frequency Division Duplex) method, or any other method (e.g., Flexible Duplex, etc.).

In an embodiment of the present invention, a wireless parameter or the like being "configured" may mean that a predetermined value is preconfigured or that a wireless parameter notified from the base station apparatus 10 or the user terminal 20 is configured.

(System Configuration)

Figure 1:
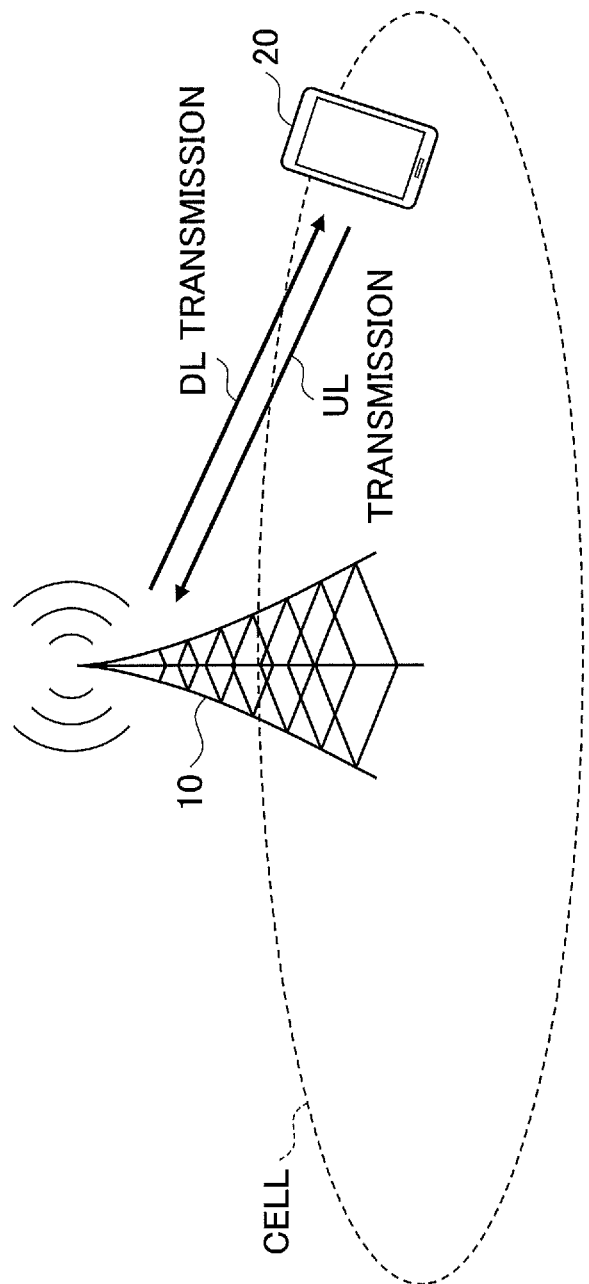
FIG. 1 is a diagram for explaining a wireless communication system according to an embodiment of the present invention.

FIG. 1 is a diagram illustrating a wireless communication system according to an embodiment of the present invention. The wireless communication system in an embodiment of the present invention includes a base station apparatus 10 and a user terminal 20, as shown in FIG. 1. In FIG. 1, one base station apparatus 10 and one user terminal 20 are shown, but this is an example and a plurality of base station apparatuses 10 and a plurality of user terminals 20 may be provided. The user terminal 20 may be referred to as a "terminal." The wireless communication system according to this embodiment may be referred to as a NR-U system.

The base station apparatus 10 is a communication device that provides one or more cells and performs wireless communication with the user terminal 20. The physical resources of the radio signal are defined in the time domain and the frequency domain, the time domain may be defined in slots or OFDM symbols, and the frequency domain may be defined in subbands, subcarriers or resource blocks.

As shown in FIG. 1, the base station apparatus 10 transmits control information or data in DL (Downlink) to the user terminal 20 and receives control information or data in UL (Uplink) from the user terminal 20. Both the base station apparatus 10 and the user terminal 20 are capable of beam forming to transmit and receive signals. Also, both the base station apparatus 10 and the user terminal 20 can apply communication by MIMO (Multiple Input Multiple Output) to DL or UL. The base station apparatus 10 and the user terminal 20 may both communicate via a CA (Carrier Aggregation) via an SCell (Secondary Cell) and a PCell (Primary Cell).

The user terminal 20 is a communication device having a wireless communication function such as a smartphone, a cellular phone, a tablet, a wearable terminal, a communication module for M2M (Machine-to-Machine), or the like. As shown in FIG. 1, the user terminal 20 utilizes various communication services provided by the wireless communication system by receiving control information or data in DL from the base station apparatus 10 and transmitting control information or data in UL to the base station apparatus 10.

Figure 2:
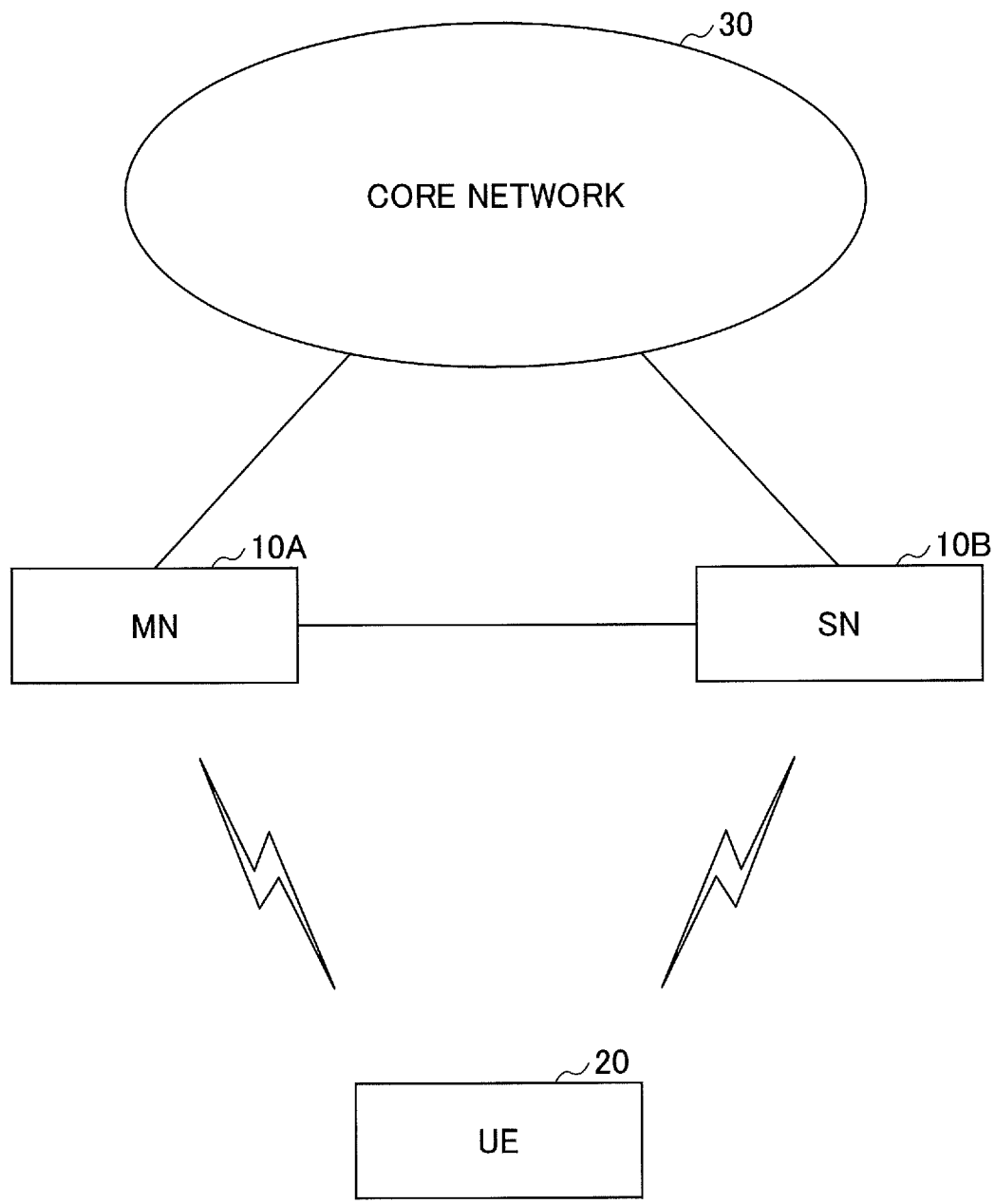
FIG. 2 is a diagram for explaining a wireless communication system according to an embodiment of the present invention.

FIG. 2 shows an example of a configuration of a wireless communication system when NR-DC (NR-Dual connectivity) is executed. As shown in FIG. 2, a base station apparatus 10A serving as an MN (Master Node) and a base station apparatus 10B serving as an SN (Secondary Node) are provided. The base station apparatus 10A and the base station apparatus 10B are each connected to a core network. The user terminal 20 communicates with both the base station apparatus 10A and the base station apparatus 10B.

A cell group provided by the base station apparatus 10A that is an MN is called an MCG (Master Cell Group), and a cell group provided by the base station apparatus 10B that is an SN is called an SCG (Secondary Cell Group). The operations described later in Examples 1 to 8 may be performed in any of the configurations of FIGS. 1 and 2.

In the wireless communication system according to the present embodiment, the LBT described before is executed. When an LBT result is idle (when the LBT is successful), the base station apparatus 10 or the user terminal 20 acquires a COT and performs transmission, and when the LBT result is busy, transmission is not performed.

The wireless communication system according to this embodiment may perform a carrier aggregation (CA) operation using an unlicensed CC and a licensed CC, a dual connectivity (DC) operation using an unlicensed CC and a licensed CC, or a stand-alone (SA) operation using an unlicensed CC alone. CA, DC, or SA may be performed by any one system of NR and LTE. DC may be performed by at least two of NR, LTE, and other systems.

The user terminal 20 may assume existence of a signal (for example, a reference signal (RS) such as Demodulation Reference Signal (DMRS)) in a PDCCH or a group common PDCCH (group common (GC)-PDCCH) to detect a transmission burst from the base station apparatus 10.

The base station apparatus 10 may transmit a specific PDCCH (PDCCH or GC-PDCCH) containing a specific DMRS notifying of start of a COT at the start of the COT initiated by the base station apparatus. At least one of a specific PDCCH and a specific DMRS may be referred to as a COT start notification signal. For example, the base station apparatus 10 transmits a COT start notification signal to one or more user terminals, and the user terminal can recognize the COT when a specific DMRS is detected.

(On Multi-TTI Grant)

In NR-U, it is assumed that a multi-TTI grant will be used to schedule multiple PUSCHes over multiple slots/multiple minislots by a single DCI. The phrase "scheduling (or to schedule)" may be rephrased with "assigning."

Multi-TTI grant schedules contiguous PUSCHes for transmitting separate TBs (transport blocks). One TB is mapped to one slot or one minislot, and the TB is transmitted by one PUSCH. One HARQ process is assigned to one PUSCH that transmits the one TB.

For multiple PUSCH scheduled by one DCI, NDI and RV are signaled per PUSCH by one DCI. The HARQ process ID notified by the DCI is applied to the first PUSCH scheduled, and HARQ process IDs of subsequent PUSCHes are incremented one by one in an order of PUSCH.

Figure 3:
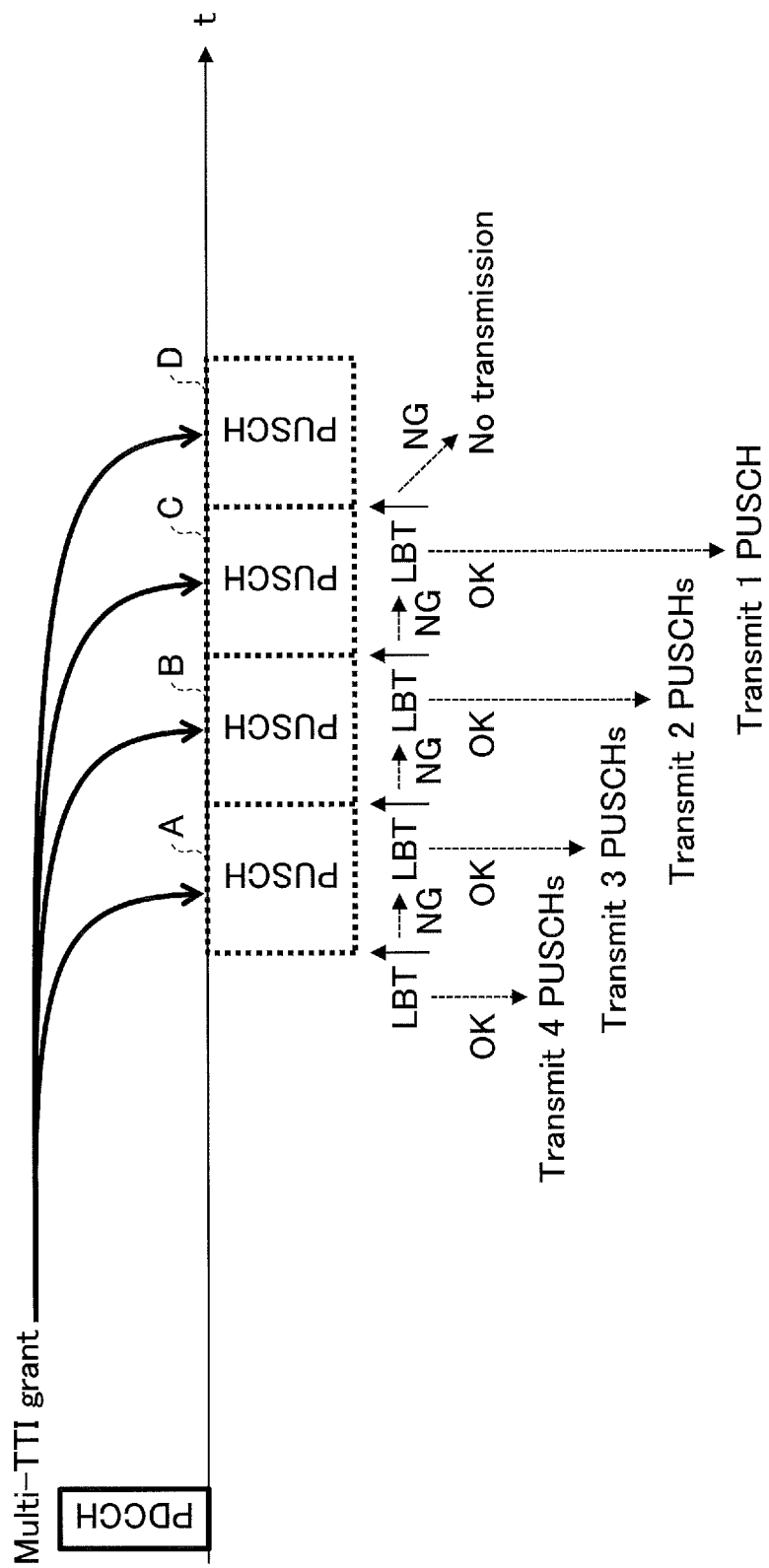
FIG. 3 is a diagram for explaining an example of Multi-TTI grant.

FIG. 3 is a diagram illustrating an example of an operation of the user terminal 20 that receives a multi-TTI grant. In the example of FIG. 3, four slots of PUSCHes are scheduled by a multi-TTI grant.

The user terminal 20 executes LBT right before a slot in which the first PUSCH indicated by A is scheduled, and transmits data by four consecutive PUSCHes if the LBT is OK. If the first LBT is NG, the user terminal 20 executes LBT right before a slot in which a PUSCH indicated by B is scheduled, and if the LBT is OK, data is transmitted by three consecutive PUSCHes. The same process is performed thereafter. If LBT is executed right before a slot in which the last PUSCH indicated by D is scheduled and the LBT is NG, no transmission is performed.

(As for Problem)

FIG. 4 is an extract from Non-Patent Document 1 showing an IE (Information Element) for configuring PUSCH time domain resources by RRC. The IE allows the user terminal 20 be configured with up to 16 kinds of definitions of time domain resources. The user terminal 20 determines which of the 16 kinds of time domain resources is used to transmit a PUSCH, by a DCI received from the base station apparatus 10.

By using the time domain resource configuration information, it can be considered to configure PUSCH time domain resources for each slot to the user terminal 20 by the IE of FIG. 4, and to specify a time domain resource to use for each slot by the DCI of the multi-TTI grant. However, for specifying the resource for each slot, information specifying time domain resources for the number of slots (or for the number of PUSCHes) to be scheduled is required, and the amount of increase in the DCI size becomes large.

Figure 5:
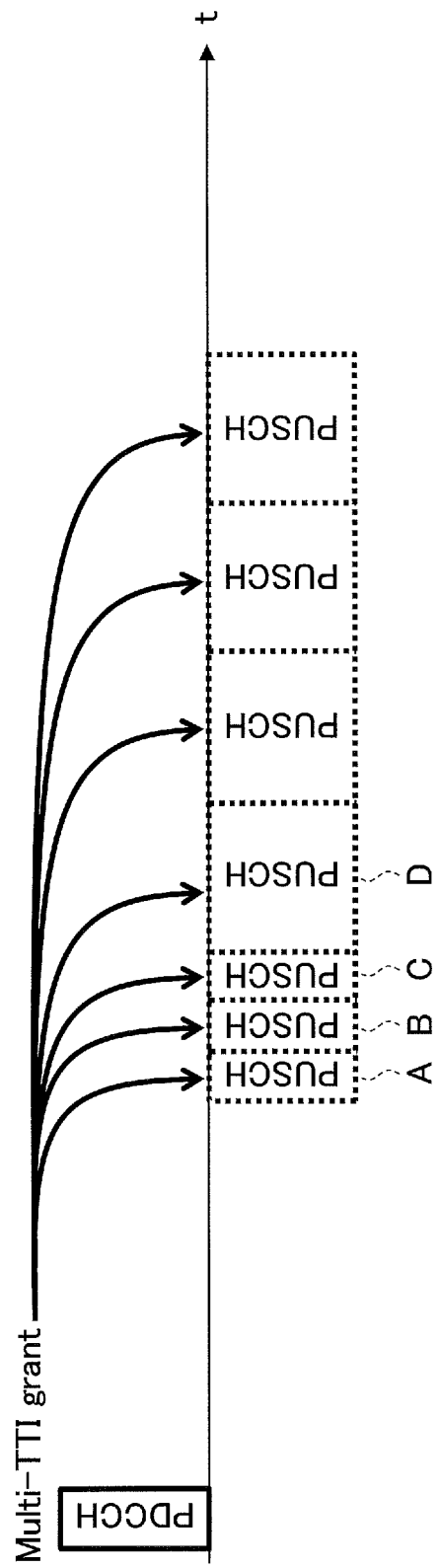
FIG. 5 is a diagram illustrating an example of a Multi-TTI grant including mini-slot based scheduling.

Also, to increase LBT opportunities in the user terminal 20, as shown in FIG. 5, it is contemplated that multiple minislot-based PUSCH scheduling is performed in the first slot of the time domain to be scheduled, and then the scheduling is switched to slot-based PUSCH scheduling at the slot boundary.

In the scheduling shown in FIG. 5, even if LBT fails before a minislot indicated by A, for example, the user terminal 20 has an opportunity to perform the next LBT before a minislot indicated by B. If LBT is successful here, only a portion of the minislot indicated by A is wasted, so that resources can be used efficiently.

However, minislot-based PUSCH scheduling is basically inefficient for eMBB (enhanced Mobile Broadband). Further, if LBT fails in any of A to C in the case of FIG. 5, in the subsequent plurality of slots, as in the case of FIG. 3, LBT is performed by slot-by-slot manner. That is, if, for example, LBT fails before a slot indicated by D, a next LBT opportunity is the end of a slot indicated by D.

Figure 6:
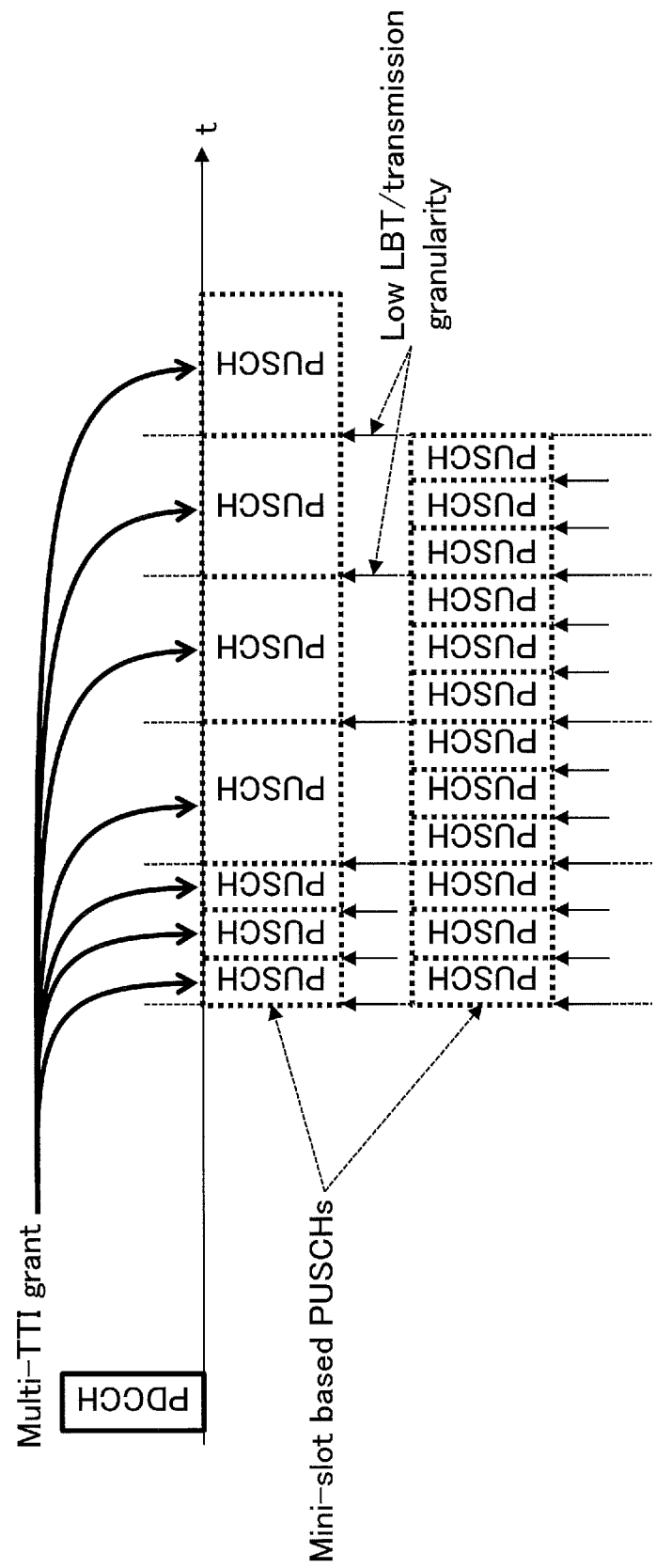
FIG. 6 is a diagram for explaining a problem.

To avoid that LBT interval becomes long as described above, it can be contemplated that minislot-based PUSCH may also be scheduled in slots after the first slot, for example, as shown in the lower part of FIG. 6. However, in this case, the user terminal 20 performs a large number of minislot-based PUSCH transmissions, making the transmission process less efficient than the slot-based PUSCH transmissions.

Hereinafter, in view of the above-described points, a technique of the multi-TTI grant that enables efficient transmission without increasing a DCI size as much as possible while keeping LBT opportunities with an appropriate granularity will be described using Examples 1 to 8. Any of Examples of Examples 1-8 may be combined unless there is a contradiction.

(Operation Examples Common to Examples 1-8)

First, an operation example of the user terminal 20 common to Examples 1-8 will be described. A PUSCH is scheduled for each of one or more consecutive slots by a multi-TTI grant transmitted from the base station apparatus 10 to the user terminal 20. Further, in the user terminal 20, one or more candidate start positions of PUSCH are configured for each slot on which a PUSCH is scheduled.

Figure 7:
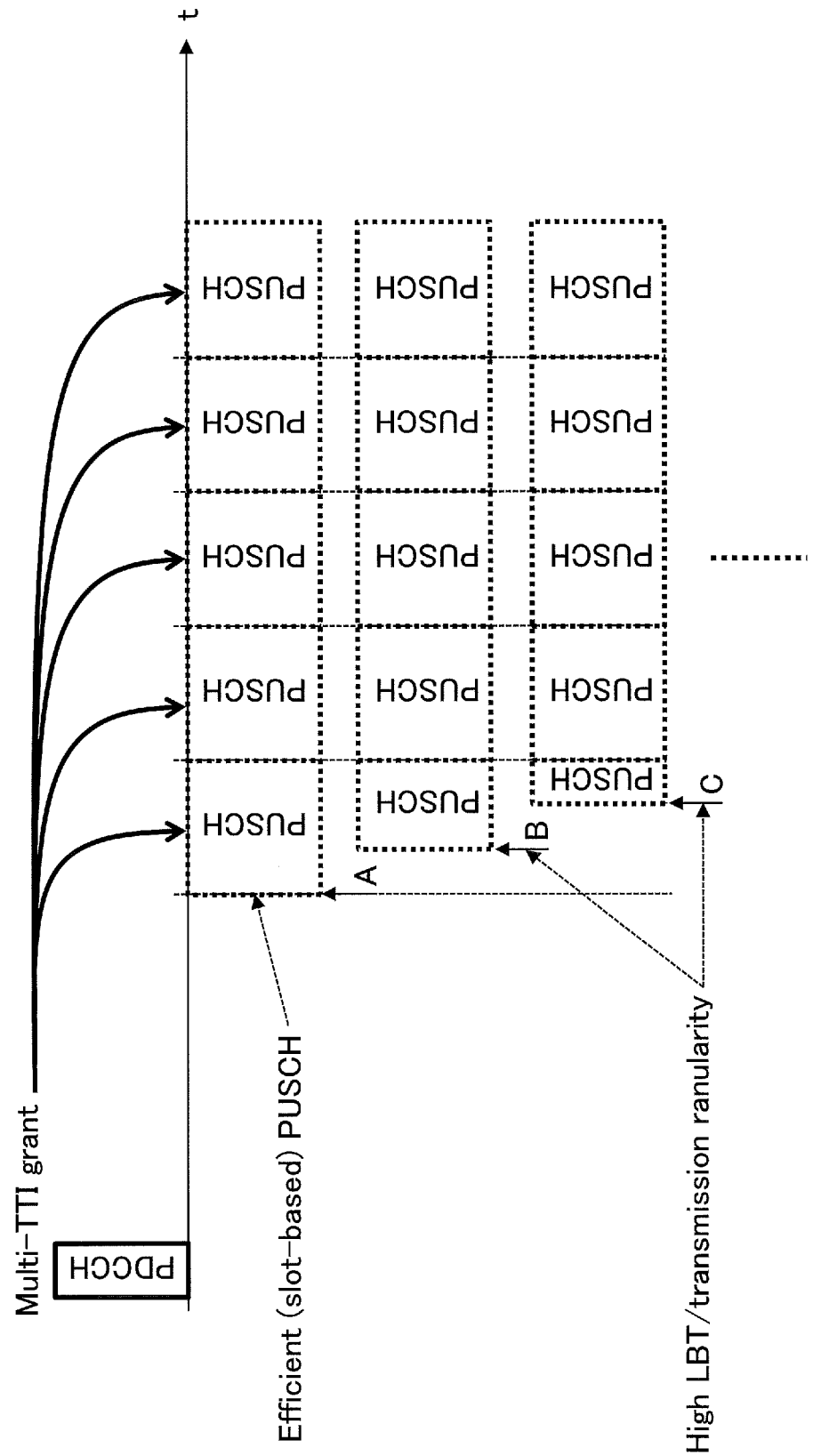
FIG. 7 is a diagram for explaining an operation of a user terminal according to an embodiment.

FIG. 7 shows an example where PUSCH is scheduled for five consecutive slots and three candidate start positions are configured for each slot by a multi-TTI grant. As will be described later, for example, configurations of candidate start positions may be different for the first slot, the last slot, and other slots.

FIG. 7 assumes, for example, that the configuration of the three candidate start positions in the first slot is applied similarly to each subsequent scheduled slot.

For example, a candidate start position indicated by A in the first slot indicates that PUSCH starts from symbol #0 in the first slot. The candidate start position indicated by B indicates that PUSCH starts in the slot, for example, from symbol #4. The candidate start position indicated by C indicates that PUSCH starts, for example, from symbol #9 in the slot. As an example, the number of symbols per slot is 14 of symbols #0 to #13.

When the user terminal 20 receives assignment information specifying 5 slots (or 5 PUSCHes) by a multi-TTI grant, the user terminal 20 generates PUSCHes of each candidate start position in each slot. For example, in the first slot, a PUSCH to be transmitted in one slot starting from A, a PUSCH to be transmitted in symbols #4 to #13 starting from B, and a PUSCH to be transmitted in symbols #9 to #13 starting from C are generated. Other slots are the same.

As will be described later in Example 7, a TBS (transport block size) in each slot may be determined without depending on the candidate start position or may be determined according to the number of symbols corresponding to the candidate start position.

The above-described "generating a PUSCH" means, for example, generating a signal to be transmitted by the PUSCH and storing it in a buffer or the like. The user terminal 20 performs the following processing on the transport block to transmit a PUSCH. For example, in "generating a PUSCH" described above, the user terminal 20 creates a signal at a stage prior to mapping to assigned resources and antenna ports.

Transport Block CRC attachment;
Code block segmentation and Code Block CRC attachment;
Channel coding: LDPC coding;
Physical-layer hybrid-ARQ processing;
Rate matching;
Scrambling;
Modulation;
Layer mapping, transform precoding (enabled/disabled by configuration), and pre-coding;
Mapping to assigned resources and antenna ports.

In the example of FIG. 7, for example, if the user terminal 20 performs LBT before A and succeeds in the LBT, the user terminal 20 transmits data by PUSCH in units of one slot in all five slots. When the user terminal 20 performs LBT before A and fails the LBT, and then performs LBT before B and succeeds in the LBT, the user terminal 20 transmits date in the first slot by PUSCH of symbols #4 to #13, and thereafter, transmits data by PUSCH in units of one slot. When the user terminal 20 fails LBT also before B, and then performs LBT before C and succeeds in the LBT, the user terminal 20 transmits data in the first slot by PUSCH of symbols #9 to #13, and thereafter, transmits data by PUSCH in units of one slot.

Further, if LBT fails in all of A, B, and C, LBT fails at A of the second slot, and then LBT is performed before B of the second slot, and the LBT succeeds in the second slot, the user terminal 20 transmits data by PUSCH of symbols #4 to #13 in the second slot, and subsequently transmits data by PUSCH in units of one slot.

As noted above, according to the present embodiment, in terms of LBT, LBT opportunities in a granularity same as that shown in lower side in FIG. 6 can be obtained. In the present embodiment, when LBT is successful in the middle of a slot, minislot-based PUSCH transmission is performed only in the slot, and slot-based PUSCH transmission is performed in the subsequent slots. Therefore, the transmission process can be more efficient than that shown in the lower side of FIG. 6.

Note that, in the example described above, when receiving a multi-TTI grant, the user terminal 20 creates a PUSCH of each candidate start position. However, such an operation is merely an example. In addition to such an operation, the user terminal 20, for example, may create and transmit a PUSCH to be transmitted after successful LBT. For example, when the user terminal 20 executes LBT before a first slot A, fails the LBT, and then performs LBT before B, and succeeds in the LBT, the user terminal 20 generates a PUSCH of symbols #4 to #13 and subsequent PUSCHes in units of slots of the subsequent slots, and transmits data by each PUSCH.

There are various variations in information to be included in a multi-TTI grant, a method to configure the candidate start position, a method to specify the candidate start position, etc. Hereinafter, these are described by using Examples 1 to 8.

EXAMPLE 1

Figure 8:
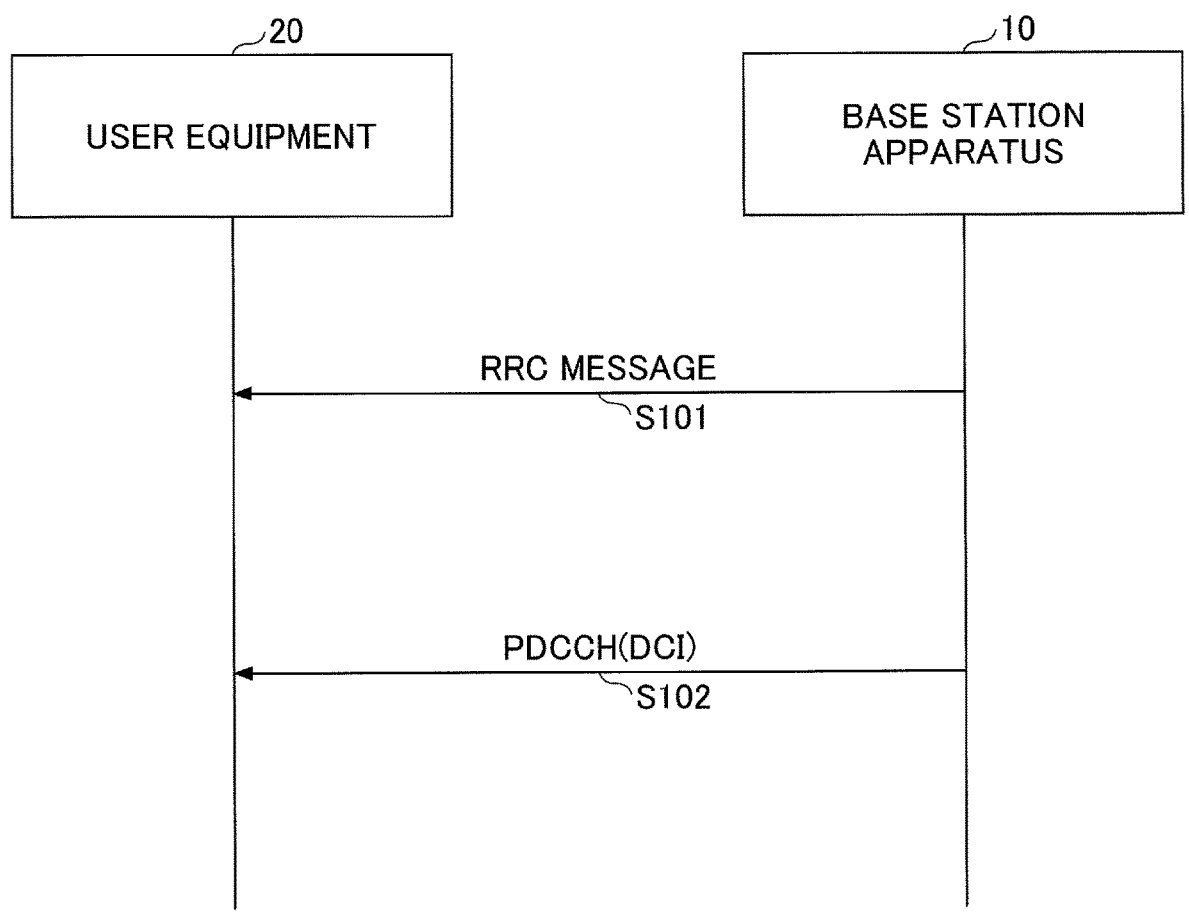
FIG. 8 is a sequence diagram illustrating an example of an operation of Example 1.

First, Example 1 will be described. FIG. 8 shows an example of an operation of the Example 1. In S101, the base station apparatus 10 transmits an RRC message (higher layer message) to the user terminal 20. The RRC message is, for example, an extension of PUSCH-config of Non-Patent Document 1.

The RRC message includes the maximum number of consecutive slots in which PUSCHes may be scheduled by a multi-TTI grant, thereby the maximum number is configured to the user terminal 20. Note that, instead of the maximum number of slots, the maximum number of consecutive PUSCHes may be configured by the RRC message. Also, both the maximum number of slots and the maximum number of consecutive PUSCHes may be configured.

The maximum number of consecutive slots configured by the RRC message is, for example, a number greater than 4, but not limited to a particular value. For example, when SCS is 30 kHz, the maximum number of slots configured by the RRC message may be 8.

The maximum number of consecutive PUSCHes configured by the RRC message is not limited to a specific value, but may be, for example, greater than 4, and for example, may be 8 or 16.

The configuration of the maximum number as described above may be executed in any of the embodiments of Examples 1-8.

In the Example 1, one or more candidate start positions per slot are configured by an RRC message of S101. For example, a message extended from PUSCH-TimeDomain-ResourceAllocation shown in FIG. 4 is included in the RRC message (e.g., PUSCH-Config).

In Example 1, a plurality of sets each being {mapping type, startSymbolAndLength} can be configured as multiple candidate starting positions for PUSCH per slot by one PUSCH-TimeDomainResourceAllocation. The RRC message includes PUSCH-TimeDomainResourceAllocationList including one or more (e.g., up to 16) PUSCH-TimeDomainResourceAllocations and the PUSCH-TimeDomainResourceAllocationList is configured to the user terminal 20.

As an example, by one PUSCH-TimeDomainResourceAllocation, configuration information (set of candidate start positions) such as {"PUSCH start position is symbol #0 and PUSCH length is 14" and "PUSCH start position is symbol #7 and PUSCH length is 7"} is configured. This corresponds to configuring multiple candidate start positions that are a start of a slot and a center of the slot.

As another example, by one PUSCH-TimeDomainResourceAllocation, configuration information that is {"PUSCH start position is symbol #0 and PUSCH length is 7" and "PUSCH start position is symbol #7 and PUSCH length is 7"} is configured. This is equivalent to configuring multiple candidate start positions that are a start of a slot and a center of the slot, as well as configuring two minislots.

In step S102 of FIG. 8, the user terminal 20 receives a DCI as a multi-TTI grant from the base station apparatus 10. The DCI is, for example, an extension of DCI format 0_0, an extension of DCI format 0_1, or a new DCI format (e.g., DCI format 0_2).

The DCI specifies the number of consecutive slots to assign PUSCHes to be transmitted (or specifies the number of consecutive PUSCHes) to the user terminal 20. The number of bits used for specifying the information is based on the maximum number configured by RRC in S101.

The DCI of S102 also specifies which PUSCH-TimeDomainResourceAllocation to use in the PUSCH-TimeDomainResourceAllocationList configured in S101. For example, if the DCI specifies PUSCH-TimeDomainResourceAllocation specifying three candidate start positions as shown in the first slot of FIG. 7 and the PUSCH-TimeDomainResourceAllocation is applied in consecutive slots (in the case of Examples 1-1 described below), the user terminal 20 performs the operation described in FIG. 7.

With respect to HARQ process ID, the user terminal 20 determines that if at least one symbol overlaps in a plurality of candidate resources corresponding to the plurality of candidate start positions specified by the DCI, the plurality of candidate resources are for one HARQ process ID.

The user terminal 20 determines that each of the plurality of candidate resources (i.e., the plurality of minislots) has an individual HARQ process ID in a case other than "when at least one symbol overlaps in the plurality of candidate resources."

The field specifying PUSCH-TimeDomainResourceAllocation in a DCI is called a TDRA field, and a value of a TDRA field is called TDRA.

Examples 1-1 and 1-2 will be described below as variations of a method of specifying TDRA by a DCI transmitted to the user terminal 20 by S102.

Example 1-1

In Examples 1-1, the DCI contains one TDRA field. The user terminal 20 determines that a TDRA of the one TDRA field applies to each of the number of consecutive slots (or consecutive PUSCHes) specified in the DCI.

Examples 1-2

In Examples 1-2, the DCI includes multiple TDRA fields. For example, the DCI may contain the same number of TDRA fields as the number of consecutive slots (or PUSCHes) and one TDRA field may correspond to one slot (PUSCH).

The DCI may also include two TDRA fields of TDRA1 field and TDRA2 field.

In this case, TDRA1 applies to all slots other than the first slot in the plural consecutive slots in which PUSCH is scheduled. K2 in TDRA1 is also used to derive the second slot.

For example, if TDRA1 is a value specifying PUSCH-TimeDomainResourceAllocation setting {"PUSCH start position is symbol #0 and PUSCH length is 7" and "PUSCH start position is symbol #7 and PUSCH length is 7"}, then in all slots other than the first slot, a multiple candidate start position that is {"PUSCH start position is symbol #0 and PUSCH length is 7" and "PUSCH start position is symbol #7 and PUSCH length is 7"} is applied.

TDRA2 also applies to the first slot in the multiple consecutive slots in which PUSCH is scheduled. K2 in TDRA2 is used to derive the first slot in the multiple continuous slots. As an example, K2 indicates the number of slots from the slot that received the DCI to the first slot. For example, if K2=1, the first slot is the next slot of the slot that received the DCI.

The number of bits of TDRA2 may be smaller than 4 bits. That is, for example, TDRA2 may be a single bit that takes only 0 and 1. In this case, if TDRA2=1, the predetermined (specified in the specification) candidate start position is applied in the first slot. If TDRA2=0, for example, TDRA1 is applied to the first slot. Also, as the above-described predetermined (specification-specified) candidate start position, a position that does not include a start position of a slot as the candidate start position, but includes the middle of the slot as the candidate start position may be defined.

In addition to the TDRA1 field and TDRA2 field described above, a TDRA3 field may be included in the DCI.

TDRA3 applies to the last slot in the multiple consecutive slots in which PUSCH is scheduled.

The number of bits of TDRA3 may be less than 4 bits. That is, for example, TDRA3 may be a single bit that takes only 0 and 1. In this case, if TDRA3=1, a predetermined (specified in the specification) candidate start position is applied in the last slot. If TDRA2=0, for example, TDRA1 is also applied to the last slot. As the predetermined (specified in the specification) candidate start position and the lengths described above, information that does not include information indicating the end of the slot, but includes the middle of the slot as the end position may be defined.

EXAMPLE 2

Figure 9:
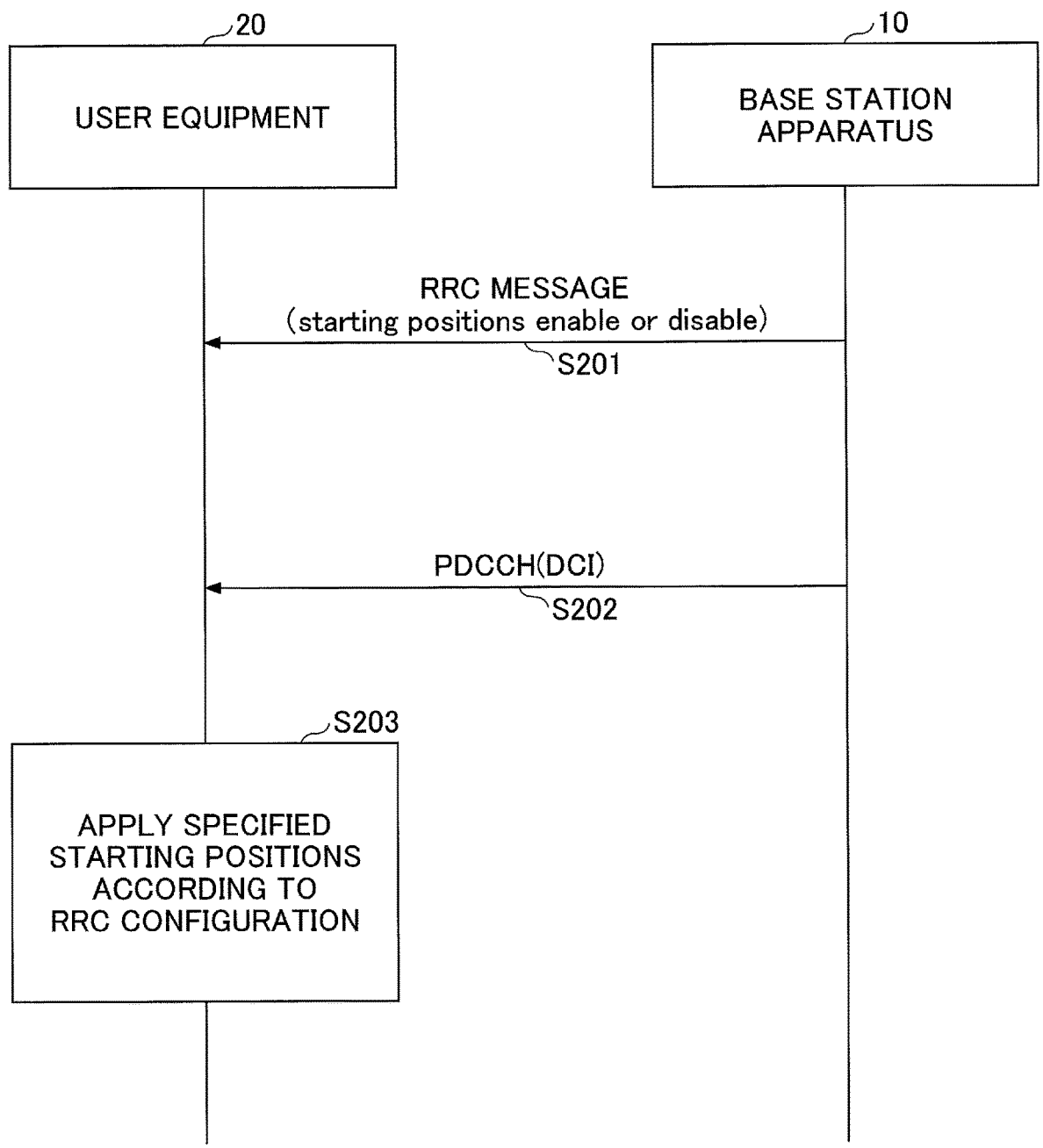
FIG. 9 is a sequence diagram illustrating an example of an operation of Example 2.

Next, Example 2 will be described. FIG. 9 is a sequence diagram illustrating an operation example of the Example 2. In S201, the base station apparatus 10 transmits an RRC message to the user terminal 20.

The RRC message is, for example, a message extended from PUSCH-Config described in Non-Patent Document 1. The RRC message includes the maximum number of consecutive slots (consecutive PUSCHes) as described in Example 1, as well as information specifying a "multiple candidate start positions" to be applied to all (each) of the multiple consecutive slots for which PUSCH is scheduled.

As an example, the "multiple candidate start positions" per slot are defined for 16 kinds according to the specification, and the user terminal 20 holds the 16 kinds of definition information in advance by a table or the like. In this example, the RRC message of S201 contains information enabling one of 16 types of "multiple candidate start positions" and disabling other "multiple candidate start positions".

For example, when the 16 types are represented by 4 bits, the number of 4 bits may indicate a "multiple candidate start positions" to be enabled (others are disabled). In other words, the information representing enable/disable is also information specifying a specific "multiple candidate start positions". This information is represented by an IE (Information Element), which will be referred to for convenience as a TDRA Information Element. The value of the TDRA information element is TDRA. Suppose a single TDRA information element contains a single TDRA value.

When the user terminal 20 receives a DCI as a multi-TTI grant in S202, in S203, the "multiple candidate start positions" enabled in S201 is applied to each of the contiguous slots on which PUSCH is scheduled by the DCI.

In the above-described example, a plurality of kinds of "multiple candidate start positions" are defined by the specification. However, at the timing before S201, or at S201, a plurality of kinds of "multiple candidate start positions" may be configured to the user terminal 20 by PUSCH-Config, and at S201, enable/disable may be configured for the plurality of kinds of "multiple candidate start positions." The plurality of kinds of "multiple candidate start positions" configured to the user terminal 20 may be one selected from a predetermined candidate pattern.

Further, in the timing before S201 or in S201, by the PUSCH-TimeDomainResourceAllocationList described in the Example 1, a plurality of kinds of "multiple candidate start positions" may be configured to the user terminal 20, and in S201, enable/disable may be configured in the plurality of kinds of "multiple candidate start positions". This case corresponds to a combination of Examples 1 and 2.

Examples 2-1 and 2-2 will be described below as variations of the TDRA information element by the RRC message (here PUSCH-Config as an example) transmitted to the user terminal 20 in S201.

Example 2-1

In Example 2-1, the PUSCH-Config contains one TDRA information element. The user terminal 20 determines that the TDRA of the one TDRA information element applies to each of the contiguous slots (or contiguous PUSCHes) scheduled by the DCI.

Example 2-2

In Example 2-2, the PUSCH-Config includes a plurality of TDRA information elements. For example, the PUSCH-Config may include the same number of TDRA information elements as the number of consecutive slots (or PUSCHes) and one TDRA information element corresponds to one slot (one PUSCH).

The PUSCH-Config may also include two TDRA information elements: the TDRA1 information element and the TDRA2 information element.

In this case, TDRA1 is applied to all slots other than the first slot in the plurality of consecutive slots in which PUSCH is scheduled. K2 in TDRA1 is used to derive the second slot.

For example, if TDRA1 specifies {"PUSCH start position is symbol #0 and PUSCH length is 7" and "PUSCH start position is symbol #7 and PUSCH length is 7"}, {"PUSCH start position is symbol #0 and PUSCH length is 7" and "PUSCH start position is symbol #7 and PUSCH length is 7"} is applied to all slots except the first slot.

TDRA2 also applies to the first slot in the multiple consecutive slots in which PUSCH is scheduled. K2 in TDRA2 is used to derive the first slot in the multiple consecutive slots. As an example, K2 indicates the number of slots from the slot in which the DCI is received to the first slot. For example, if K2=1, the first slot is the next slot of the slot in which the DCI is received.

The number of bits of TDRA2 may be smaller than 4 bits. That is, for example, TDRA2 may be a single bit that takes only 0 and 1. In this case, if TDRA2=1, a predetermined (specified in the specification) candidate start position is applied in the first slot. If TDRA2=0, for example, TDRA1 is also applied to the first slot. As the above-described predetermined (specification-specified) candidate start position, one that does not include the start of a slot as a candidate start position, but includes the middle of a slot as the candidate start position may be defined.

In PUSCH-Config, in addition to the TDRA1 and TDRA2 information elements described above, a TDRA3 information elements may be included.

TDRA3 is applied to the last slot in the multiple consecutive slots in which PUSCH is scheduled.

The number of bits in TDRA3 may be less than 4 bits. That is, for example, TDRA3 may be a single bit that takes only 0 and 1. In this case, if TDRA3=1, a predetermined (specified in the specification) candidate start position is applied in the last slot. If TDRA2=0, for example, TDRA1 is also applied to the last slot. As the predetermined (specified in the specification) candidate start position and the length described above, one that does not include one indicating the end of the slot, but includes the middle of the slot as the end position may be defined.

EXAMPLE 3

Figure 10:
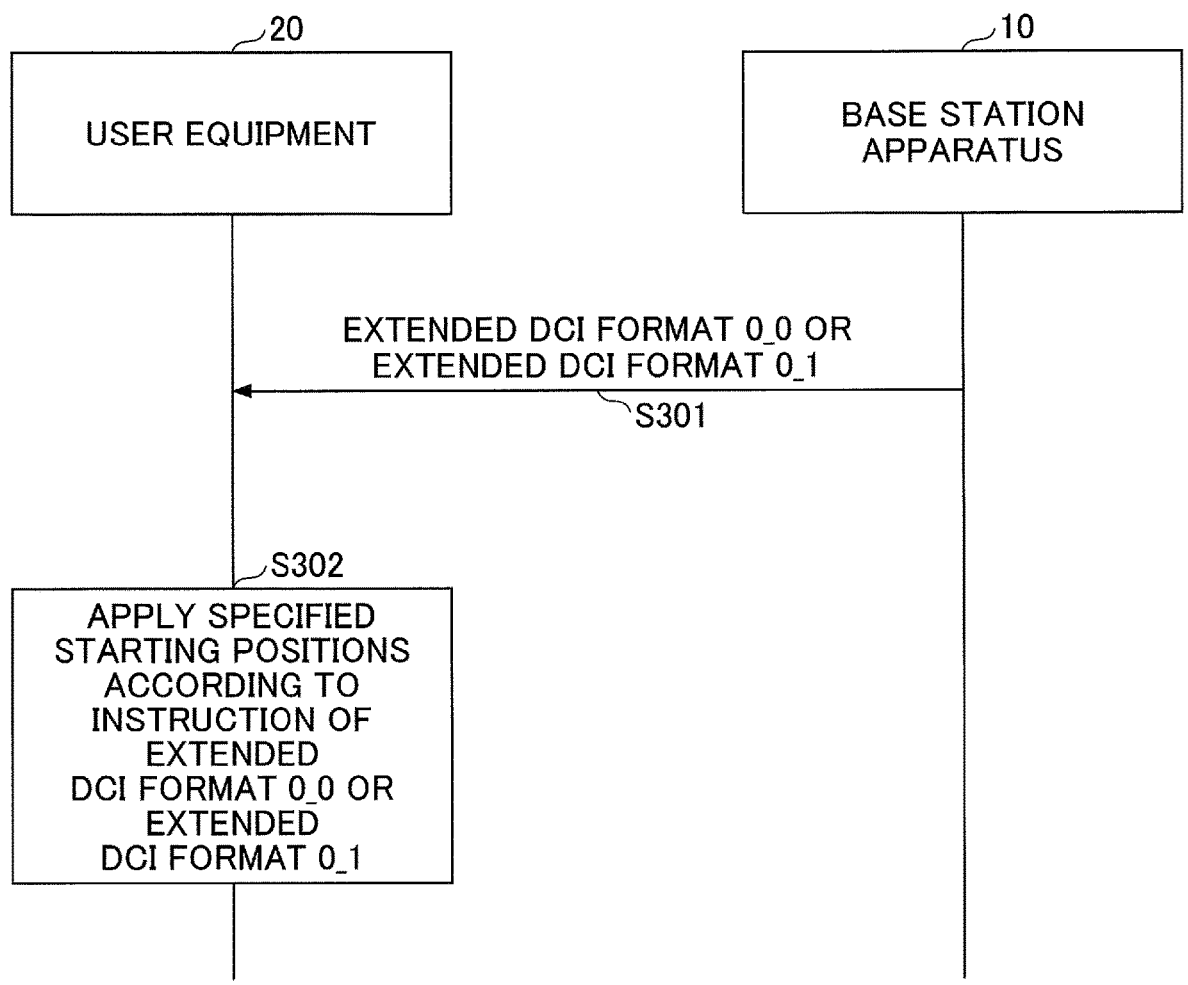
FIG. 10 is a sequence diagram illustrating an example of an operation of Example 3.

Next, Example 3 will be described. FIG. 10 is a sequence diagram of the Example 3. In S301, an extended DCI format 0_0 or an extended DCI format 0_1 (described as extended DCI format 0_0/extended DCI format 0_1) is transmitted from the base station apparatus 10 to the user terminal 20. Both extended DCI format 0_0 and extended DCI format 0_1 are extensions of DCI format 0_0 and DCI format 0_1 described in Non-Patent Documents 2 to 4.

Extended DCI format 0_0/extended DCI format 0_1 contains the number of consecutive slots (or the number of consecutive PUSCHes) for scheduling PUSCH and information specifying multiple candidate start position, as a multi-TTI grant. Here, for convenience, a new field of information specifying multiple candidate start positions is called a TDRA field, and that value (that is, a value indicating which "multiple candidate start positions" to apply) is called a TDRA.

As an example, 16 kinds of "multiple candidate start positions" per slot are defined by a specification, and the user terminal 20 holds the 16 kinds of definition information in advance by a table or the like. In this example, the extended DCI format 0_0/extended DCI format 0_1 of S301 includes information, as TDRA in the TDRA field, indicating that one of 16 kinds of "multiple candidate start positions" is allowed and that other kinds of "multiple candidate start positions" are not allowed.

For example, when the 16 kinds are represented by 4 bits, the number of 4 bits may indicate the "multiple candidate start position" to be allowed (others are not allowed). In other words, the TDRA here is information specifying a specific "multiple candidate start positions".

In S302, the user terminal 20 applies the "multi-candidate start position" allowed in S301 to each of the consecutive slots in which PUSCH is scheduled.

In the above example, a plurality of kinds of "multiple candidate start positions" are defined by the specification. However, at the timing before S301, by PUSCH-TimeDomainResourceAllocationList of Example 1 or by PUSCH-Config of Example 2, a plurality of kinds of "multiple candidate start positions" may be configured to the user terminal 20, and "multiple candidate start positions" to be applied from the plurality of kinds of "multiple candidate start positions" may be indicated by the extended DCI format 0_0/extended DCI format 0_1.

Hereinafter, Examples 3-1 and 3-2 will be described as variations of the method of specifying TDRA by the extended DCI format 0_0/extended DCI format 0_1 transmitted to the user terminal 20 in S301.

Example 3-1

In Example 3-1, an extended DCI format 0_0/extended DCI format 0_1 contains a single TDRA field. The user terminal 20 determines that the TDRA of the one TDRA field is applied to each of the number of consecutive slots (or consecutive PUSCHes) specified by the extended DCI format 0_0/extended DCI format 0_1.

Example 3-2

In Example 3-2, the extended DCI format 0_0/extended DCI format 0_1 contains multiple TDRA fields. For example, the extended DCI format 0_0/extended DCI format 0_1 may contain the same number of TDRA fields as the number of consecutive slots (or the number of consecutive PUSCHes) and one TDRA field corresponds to one slot (PUSCH).

The extended DCI format 0_0/extended DCI format 0_1 may include two TDRA fields that are a TDRA1 field and a TDRA2 field.

In this case, TDRA1 is applied to all slots other than the first slot in the multiple consecutive slots in which PUSCH is scheduled. K2 in TDRA1 is used to derive the second slot.

TDRA2 is applied to the first slot in the multiple consecutive slots in which PUSCH is scheduled. K2 in TDRA2 is used to derive the first slot in the multiple continuous slots. As an example, K2 indicates the number of slots from the slot that received a DCI to the first slot. For example, if K2=1, the first slot is the next slot of the slot that received the DCI.

The number of bits of TDRA2 may be smaller than 4 bits. That is, for example, TDRA2 may be a single bit that takes only 0 and 1. In this case, if TDRA2=1, a predetermined (specified in the specification) candidate start position is applied in the first slot. If TDRA2=0, for example, TDRA1 is also applied to the first slot. As the above-described predetermined (specification-specified) candidate start position, one that does not include the start of the slot as a candidate start position, but includes the middle of the slot as a candidate start position may be defined.

In extended DCI format 0_0/extended DCI format 0_1, in addition to the TDRA1 and TDRA2 fields above, a TDRA3 field may be included.

TDRA3 applies to the last slot in the multiple consecutive slots in which PUSCH is scheduled.

The number of bits in TDRA3 may be less than 4 bits. That is, for example, TDRA3 may be a single bit that takes only 0 and 1. In this case, if TDRA3=1, the predetermined (as specified in the specification) candidate start position is applied in the last slot. If TDRA2=0, for example, TDRA1 is also applied to the last slot. As the predetermined (specified in the specification) candidate start position and the length described above, one that does not include information indicating the end of the slot, but includes the middle of the slot as the end position may be defined.

Example 3-3

Monitoring of a DCI by the user terminal 20 according to the Example 3 will be described as Example 3-3. Example 3-3 may also be applied to Examples 1 and 2.

The user terminal 20 may be configured to monitor one or both of a single TTI grant and a multi-TTI grant. The configuration may be performed by an RRC message, a MAC signal (such as a MAC CE), or a DCI from the base station apparatus 10 to the user terminal 20, or may be preconfigured to the user terminal 20.

For example, extended DCI format 0_0/extended DCI format 0_1 may be used for both single TTI grant and multi-TTI grant. In this case, for example, if the number of consecutive slots (or the number of PUSCHes) that transmits PUSCH is specified in the extended DCI format 0_0/extended DCI format 0_1, the user terminal 20 determines that it is a multi-TTI grant, and otherwise determines that it is a single TTI grant.

For example, the extended DCI format 0_1 may be used as a multi-TTI grant and existing or extended DCI format 0_0 may be used as a single TTI grant.

EXAMPLE 4

Figure 11:
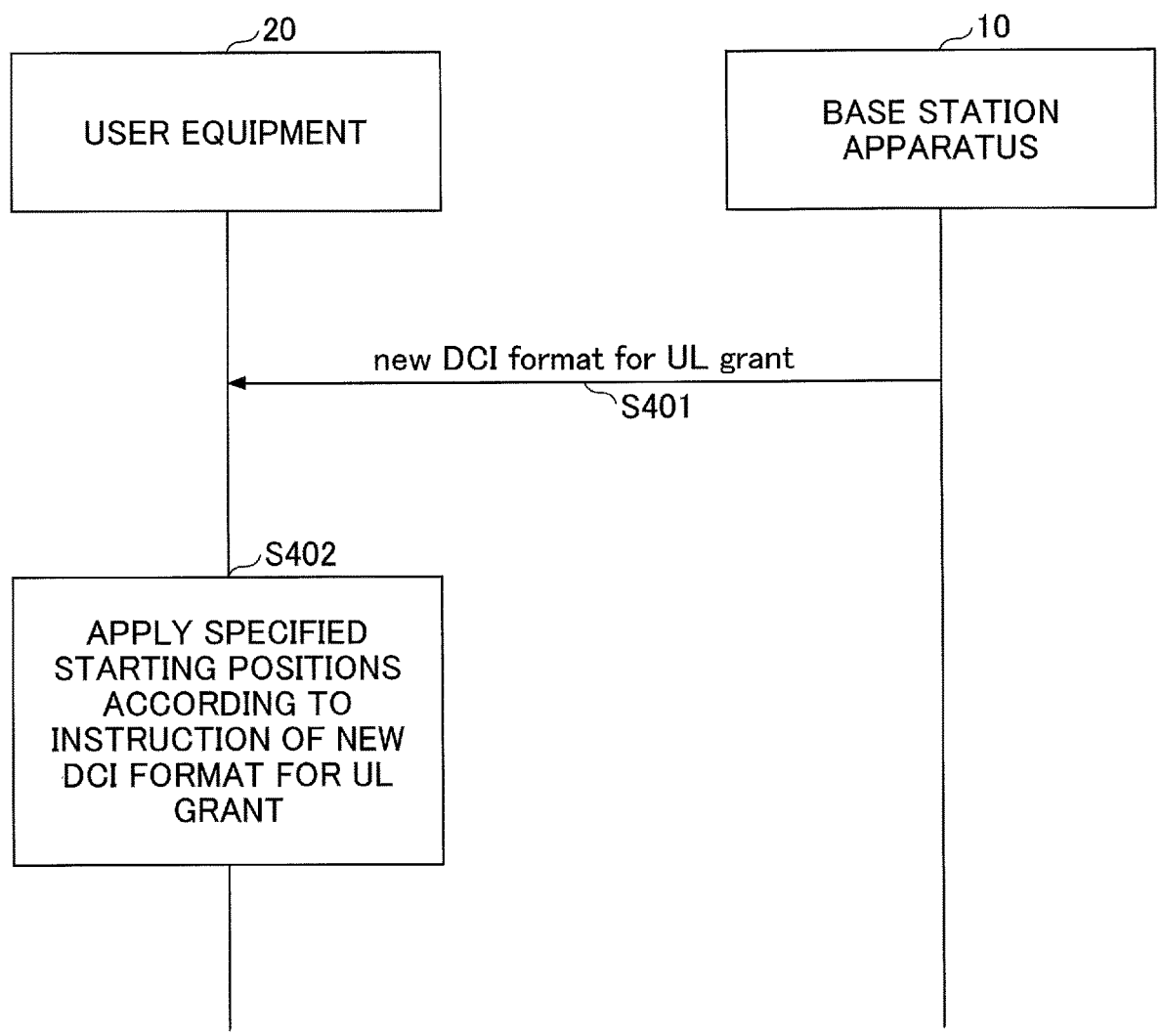
FIG. 11 is a sequence diagram illustrating an example of an operation of Example 4.

Example 4 will now be described. FIG. 11 is a sequence diagram of Example 4. In S401, a new DCI format (for example, a DCI format 0_2) that is a new DCI format not exiting in the existing technologies is transmitted from the base station apparatus 10 to the user terminal 20.

The new DCI format, as a multi-TTI grant, contains the number of consecutive slots (or the number of PUSCHes) for transmitting PUSCH and information specifying multiple candidate start positions. Here again, for convenience, the field of information specifying multiple candidate start positions is called a TDRA field, and that value (that is, the value indicating which "multiple start candidate positions" to apply) is called a TDRA.

The application method and variations (TDRA1, TDRA2, TDRA3, etc.) of the TDRA are the same as those described in Examples 3-1 and 3-2 for the extended DCI format 0_0/extended DCI format 0_1 of Example 3.

In S402, the user terminal 20 applies the "multiple candidate start position" allowed in S401 to each of the consecutive slots assigned for PUSCH transmission.

In the above example, multiple kinds of "multiple candidate start positions" are defined by the specification. However, this is an example, in the timing before S401, by the PUSCH-TimeDomainResourceAllocationList of Example 1 or the PUSCH-Config of Example 2, a plurality of kinds of "multiple candidate start positions" may be configured to the user terminal 20, and a "multiple candidate start positions" to be applied from the plurality of kinds of "multiple candidate start positions" may be indicated in the new DCI format.

Examples 4-1 and 4-2 will be described for monitoring of the new DCI format by the user terminal 20.

Example 4-1

The user terminal 20 may be configured to monitor both DCI format 0_0/DCI format 0_1 as a single TTI grant and a new DCI format as a multi-TTI grant. The configuration may be performed by an RRC message, a MAC signal (such as a MAC CE), or a DCI from the base station apparatus 10 to the user terminal 20, or may be preconfigured to the user terminal 20.

The number of different DCI sizes to be monitored by the user terminal 20 is, for example, four or less. However, when NR-U is assumed, the number of different DCI sizes to be monitored by the user terminal 20 may be 5 or less.

Example 4-2

The user terminal 20 may be configured to monitor one of DCI format 0_0/DCI format 0_1 as a single TTI grant and the new DCI format as a multi-TTI grant. The configuration may be performed by an RRC message, a MAC signal (such as a MAC CE), or a DCI from the base station apparatus 10 to the user terminal 20, or may be preconfigured to the user terminal 20.

The new DCI format may also be used for both single TTI grant and multi-TTI grant. In this case, for example, if the number of consecutive slots (or the number of PUSCHes) that transmit PUSCH is specified in the new DCI format, the user terminal 20 determines that it is a multi-TTI grant, and otherwise determines that it is a single TTI grant.

According to any of Examples 1-4, it is possible that the user terminal performs efficient transmission while keeping LBT opportunities of an appropriate granularity.

EXAMPLE 5

Figure 12:
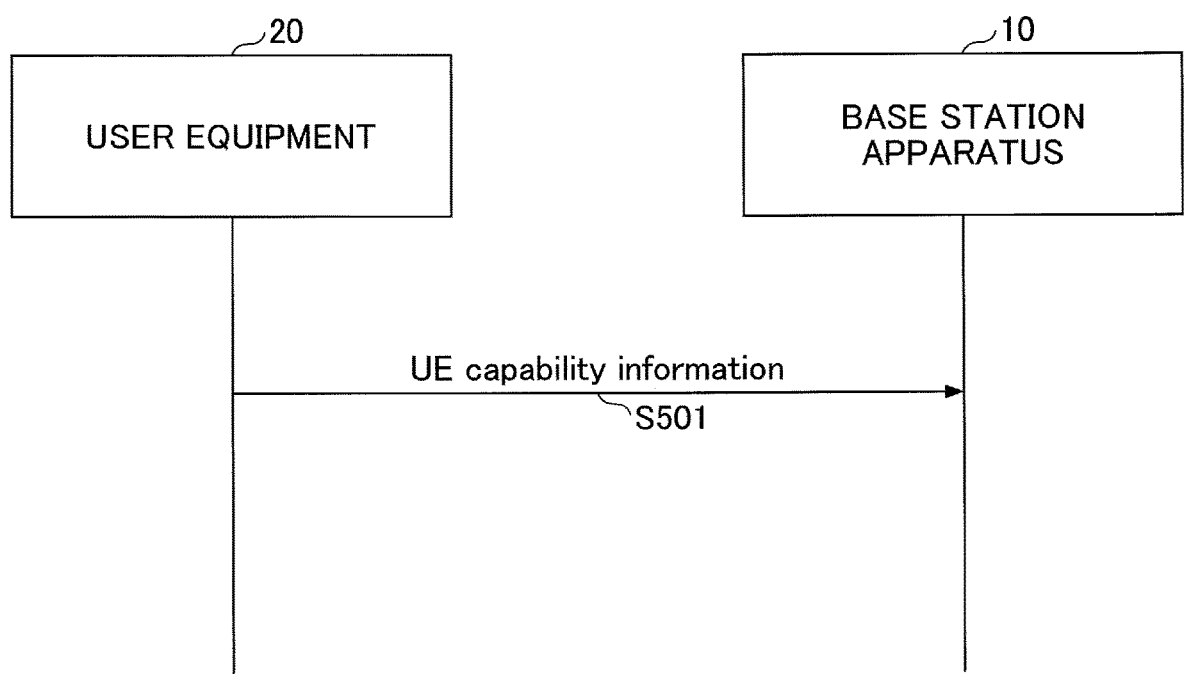
FIG. 12 is a sequence diagram illustrating an example of an operation of Example 5.

Next, Example 5 will be described. Example 5 is applicable to all of Examples 1-4. FIG. 12 is a sequence diagram illustrating an example of an operation of Example 5. In S501, the user terminal 20 transmits, to the base station apparatus, capability information indicating whether or not the user terminal 20 supports an operation (for example, an operation described with reference to FIG. 7) based on a "multiple candidate starting positions" for example. The base station apparatus 10 that receives the capability information may perform scheduling according to the capability information. Examples 5-1, 5-2, and 5-3 will be described as specific examples.

Example 5-1

In Example 5-1, the user terminal 20 supporting NR-U UL must support (always supports) the multi-TTI grant and transmits the capability information indicating whether or not the operation based on the "multiple candidate start positions" is supported to the base station apparatus 20.

In the Example 5-1, the capability information transmitted from the user terminal 20 includes information explicitly representing whether or not the operation based on the "multiple candidate start positions" is supported.

Further, the capability information transmitted from the user terminal 20 according to the Example 5-1 may include the maximum number of candidate start positions per slot supported by the user terminal 20 in addition to or instead of the information explicitly indicating whether or not the operation based on the "multiple candidate start positions" is supported.

Example 5-2

In the Example 5-2, the user terminal 20 transmits the capability information indicating whether or not the multi-TTI grant is supported to the base station apparatus 10. The user terminals 20 supporting multi-TTI grant must support (always support) operations based on the "multiple candidate start positions".

Example 5-3

In the Example 5-3, the user terminal 20 transmits the capability information separately including whether or not the multi-TTI grant is supported and whether or not the operation based on the "multiple candidate start positions" is supported to the base station apparatus 10.

According to Example 5, the base station apparatus 10 can perform scheduling according to the capability of the user terminal 20.

EXAMPLE 6

Next, Example 6 will be described. Example 6 is applicable to all of Examples 1-5.

In the Example 6, the single TTI scheduling and the multi-TTI scheduling are dynamically switched for the user terminal 20 by the method described in at least the following Examples 6-1 to 6-4.

Example 6-1

In Example 6-1, switching is accomplished by changing a TDRA entry (which may be referred to as a TDRA field).

For example, when the user terminal 20 receives a DCI storing the TDRA field at a bit position within a specific range A from the base station apparatus 10, the user terminal 20 determines that the DCI is a DCI for single TTI scheduling. When the user terminal 20 receives a DCI storing the TDRA field at a bit position in a specific range B (a range different from the A) from the base station apparatus 10, the user terminal 20 determines that the DCI is a DCI for multi-TTI scheduling.

Example 6-2

In Example 6-2, switching is performed according to the number of slots (or PUSCHes) in which PUSCH is scheduled.

For example, when the user terminal 20 receives from the base station apparatus 10, a DCI in which 1 is designated as the number of slots (or the number of PUSCHes) on which PUSCH is scheduled, the user terminal 20 determines that the DCI is a DCI for single TTI scheduling. When the user terminal 20 receives a DCI designating a number larger than 1 as the number of slots (or the number of PUSCHes) on which PUSCH is scheduled from the base station apparatus 10, the user terminal 20 determines that the DCI is a DCI for multi-TTI scheduling.

Example 6-3

In Examples 6-3, switching is performed according to an RNTI used for scrambling a CRC attached to a DCI.

For example, when the user terminal 20 can decode the DCI with RNTI-A, the user terminal 20 determines that the DCI is a DCI for single TTI scheduling. When the user terminal 20 is able to decode the DCI with RNTI-B different from the RNTI-A, the user terminal 20 determines that the DCI is a DCI for multi-TTI scheduling.

Example 6-4

In Examples 6-4, switching is performed depending on a search space for monitoring the DCI. Here, for example, it is assumed that a search space A and a search space B are configured in the user terminal 20. The frequency domain resources or time domain resources to be monitored differ between the search space A and the search space B. Both frequency domain resources and time domain resources to be monitored may be different between the search space A and the search space B.

For example, when the user terminal 20 can decode the DCI received in the search space A, the user terminal 20 determines that the DCI is a DCI for single TTI scheduling. When the user terminal 20 can decode the DCI received by the search space B, the user terminal 20 determines that the DCI is a DCI for multi-TTI scheduling.

In the context of Examples 6-3 and 6-4, between different RNTIs or between different search spaces, the user terminal 20 may use different TDRA tables or different parameters.

For example, suppose that a TDRA table A storing a plurality of "multiple candidate start positions" and a TDRA table B storing a plurality of "multiple candidate start positions" (different from the TDRA table A) are specified in the specification and configured in advance in the user terminal 20. Further, it is assumed that the RNTI-A and the RNTI-B are configured in the user terminal 20.

At this time, for example, when the user terminal 20 can decode the DCI with the RNTI-A, the user terminal 20 determines multiple candidate start positions designated by the DCI by referring to the TDRA table A. When the user terminal 20 is able to decode the DCI with the RNTI-B, the user terminal 20 determines multiple candidate start positions specified by the DCI by referring to the TDRA table B.

According to the Example 6, the user terminal 20 can dynamically switch between single TTI scheduling and multi-TTI scheduling.

EXAMPLE 7

Next, an example of a method for determining a TBS (transport block size) when transmitting PUSCH in a portion of a slot will be described as Example 7. TBS is a data size that can be transmitted by one PUSCH transmission.

Example 7-1

In Example 7-1, the user terminal 20 determines the TBS independent of the start position of the PUSCH in the slot. That is, in the example shown in FIG. 13 similar to FIG. 7, taking the first slot in which PUSCH is scheduled as an example, the user terminal 20 determines a TBS having a size common to PUSCH having one slot represented by A, PUSCH having one partial slot represented by B, and PUSCH having one partial slot represented by C.

Figure 13:
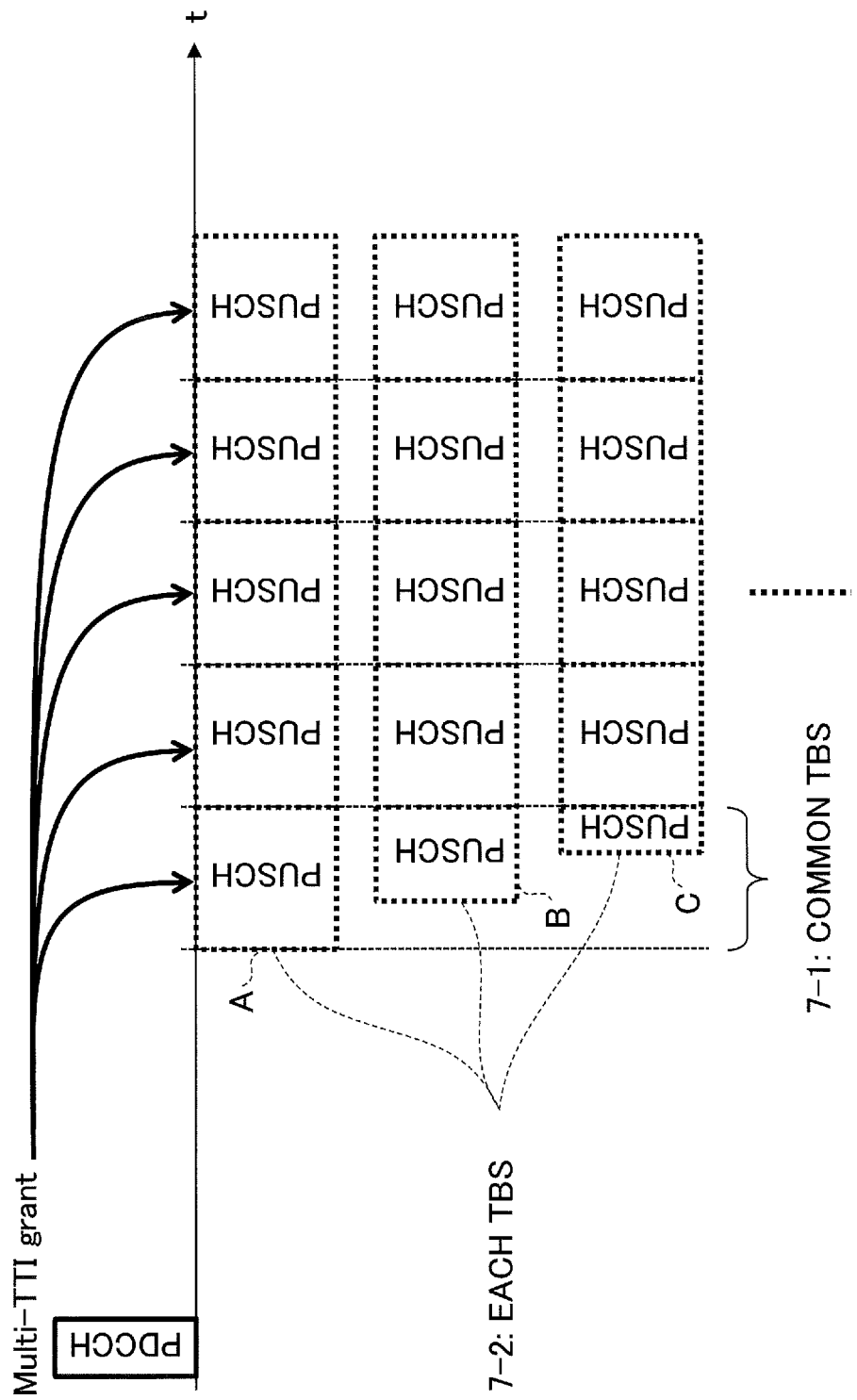
FIG. 13 is a diagram for explaining Example 7.

For example, the user terminal 20 determines the TBS assuming the first candidate start position. In the case of FIG. 13, TBS is determined assuming A. The user terminal 20 may assume the last candidate start position to determine the TBS. In this case, in FIG. 13, TBS is determined assuming C.

The user terminal 20 may assume the first candidate start position and apply a predetermined scaling factor (e.g., 0.75). For example, if TBS=200 bytes before applying the scaling factor: 0.75, then 200×0.75 is determined as the final TBS.

Example 7-2

In Example 7-2, the user terminal 20 determines the TBS based on the candidate start position, i.e., the number of available symbols. In the example of FIG. 13, the user terminal 20 determines TBS for each of A, B, and C.

According to the Example 7, the user terminal 20 can appropriately determine the TBS.

EXAMPLE 8

An alternative example applicable to all of Examples 1 to 7 will be described as Example 8. In Example 8, the multiple candidate start positions are predetermined. For example, the specification specifies multiple candidate start positions and the user terminal 20 is preconfigured with it and performs an operation as shown in FIG. 7, for example.

That is, when the user terminal 20 receives a multi-TTI grant from the base station apparatus 10, the user terminal executes LBT in accordance with a preconfigured candidate start position as described above, and performs data transmission by a PUSCH from the start position where the LBT is successful. In Example 8, there is no explicit configuration/designation of multiple candidate start positions by DCI or RRC described in Examples 1-4, etc.

According to the Example 8, the user terminal 20 can perform an operation applying the multiple candidate start positions without receiving an explicit configuration/designation of the multiple candidate start positions by a DCI or an RRC.

(Apparatus Configuration)

Next, a functional configuration example of the base station apparatus 10 and the user terminal 20 that perform the processing and operations described above will be described. The base station apparatus 10 and the user terminal 20 include functions for implementing the above-described Examples 1-8. However, each of the base station apparatus 10 and the user terminal 20 may include only some of the functions of the Examples 1-8.

<Base Station Apparatus 10>

Figure 14:
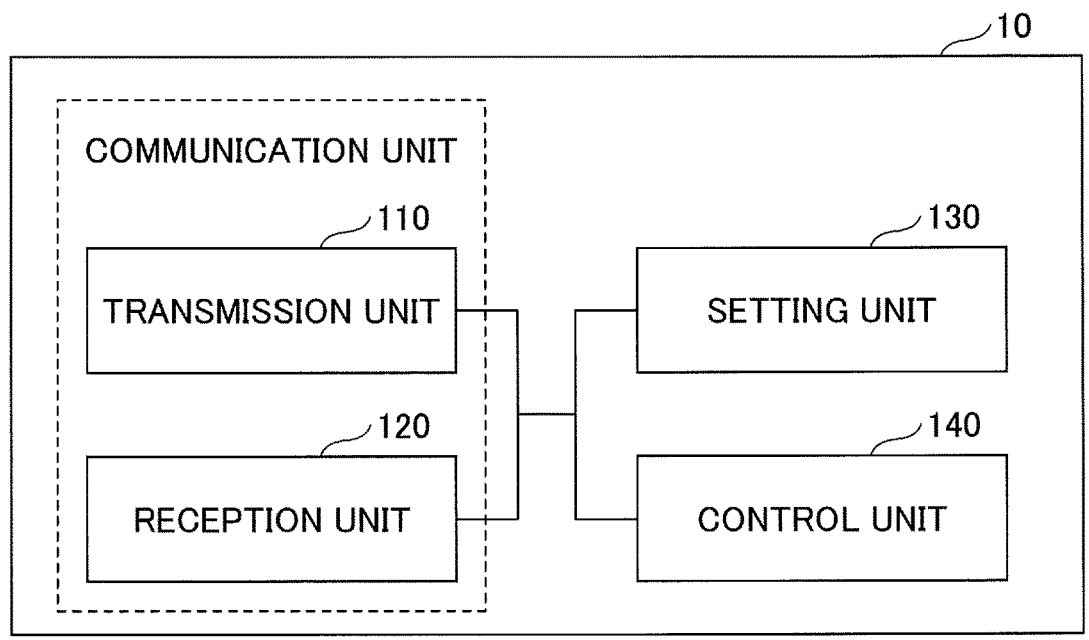
FIG. 14 is a diagram showing an example of a functional configuration of a base station apparatus 10 according to an embodiment of the present invention.

FIG. 14 is a diagram illustrating an example of a functional configuration of the base station apparatus 10. As shown in FIG. 14, the base station apparatus 10 includes a transmission unit 110, a reception unit 120, a setting unit 130, and a control unit 140. The functional configuration shown in FIG. 14 is only one example. As long as the operation according to the embodiments of the present invention can be performed, the functional classification and the name of the functional unit may be any one. The transmission unit 110 and the reception unit 120 may be collectively referred to as a communication unit.

The transmission unit 110 includes a function for generating a signal to be transmitted to the user terminal 20 side and transmitting the signal wirelessly. The receiving unit 120 includes a function for receiving various signals transmitted from the user terminal 20 and acquiring, for example, information of a higher layer from the received signals. The transmission unit 110 has a function to transmit NR-PSS, NR-SSS, NR-PBCH, and DL/UL control signals, DCI by PDCCH, data by PDSCH, and the like to the user terminal 20. The function of executing the LBT is provided by the transmission unit 110 because it is a function related to transmission. Alternatively, the receiving unit 120 may provide a function to execute the LBT.

The setting unit 130 stores the preconfigured configuration information and various configuration information to be transmitted to the user terminal 20 in the storage device provided by the setting unit 130 and reads the preconfigured configuration information from the storage device as necessary.

The control unit 140 schedules DL reception or UL transmission of the user terminal 20 through the transmission unit 110. A function unit related to signal transmission in the control unit 140 may be included in the transmission unit 110, and a function unit related to signal reception in the control unit 140 may be included in the receiving unit 120. The transmission unit 110 may be called a transmitter, and the reception unit 120 may be called a receiver.

<User Terminal 20>

Figure 15:
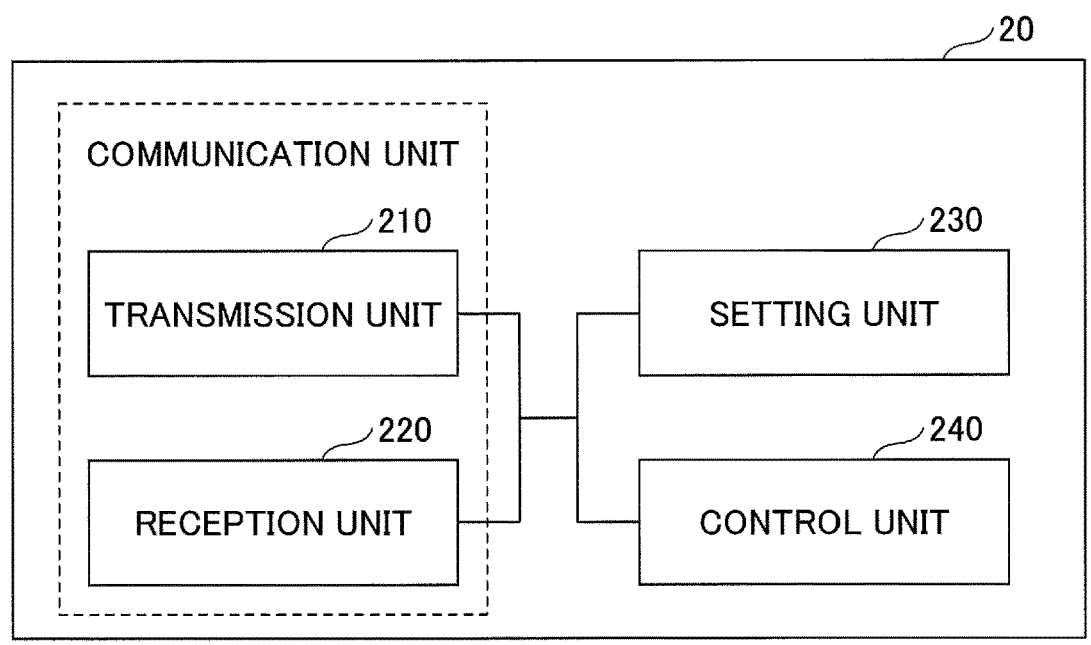
FIG. 15 is a diagram showing an example of a functional configuration of a user terminal 20 according to an embodiment of the present invention.

FIG. 15 is a diagram illustrating an example of the functional configuration of the user terminal 20. As shown in FIG. 15, the user terminal 20 includes a transmission unit 210, a reception unit 220, a setting unit 230, and a control unit 240. The functional configuration shown in FIG. 15 is only one example. As long as the operation according to the embodiments of the present invention can be performed, the functional classification and the name of the functional unit may be any one. The transmission unit 210 and the reception unit 220 may be collectively referred to as a communication unit. The user terminal 20 may be referred to as a terminal.

The transmission unit 210 creates a transmission signal from the transmission data and wirelessly transmits the transmission signal. The receiving unit 220 receives various signals wirelessly and acquires signals from higher layers from the received signal of the physical layer. The receiving unit 220 has a function to receive the NR-PSS, NR-SSS, NR-PBCH, and DL/UL/SL control signals transmitted from the base station apparatus 10, the DCI by the PDCCH, data by the PDSCH, and the like. For example, the transmitting unit 210 may transmit PSCCH (Physical Sidelink Control Channel), PSSCH (Physical Sidelink Shared Channel), PSDCH (Physical Sidelink Discovery Channel), PSBCH (Physical Sidelink Broadcast Channel), etc. to another user terminal 20 as D2D communication, and the receiving unit 120 may receive PSCCH, PSSCCH, PSDCH, PSDCH, or PSBCH, etc. from another user terminal 20. The function of executing the LBT is provided by the transmission unit 210 because it is a function related to transmission. Alternatively, the receiving unit 220 may provide a function to execute the LBT.

The setting unit 230 stores various configuration information received from the base station apparatus 10 or a user terminal 20 by the receiving unit 220 in the storage device provided by the setting unit 230 and reads it from the storage device as necessary. The setting unit 230 also stores the preconfigured configuration information.

The control unit 240 performs control of the user terminal 20. A function unit related to signal transmission in the control unit 240 may be included in the transmission unit 210, and a function unit related to signal reception in the control unit 240 may be included in the receiving unit 220. The transmission unit 210 may be referred to as a transmitter, and the reception unit 220 may be referred to as a receiver.

[Summary]

In accordance with the present embodiment, at least a terminal shown in the following items 1 to 6 is provided.

(Item 1)

A terminal including:

a reception unit 220 configured to receive, from a base station apparatus, control information designating a number of continuous slots to which a physical uplink shared channel is assigned, or a number of continuous physical uplink shared channels; and a transmission unit 210 configured, when LBT succeeds at any one of a plurality of candidate start positions in a slot of continuous slots to which the physical uplink shared channel is assigned, to start data transmission by the physical uplink shared channel from a candidate start position at which LBT succeeds.

(Item 2)

The terminal as described in item 1, wherein the reception unit receives, from the base station apparatus, configuration information for configuring one or more sets each including a plurality of candidate start positions, the control information includes information for designating a set, in the one or more sets, that the terminal applies, and the transmission unit applies a plurality of candidate start positions of the designated set.

(Item 3)

The terminal as described in item 1, wherein the reception unit receives, from the base station apparatus, configuration information designating a plurality of candidate start positions that the terminal applies, and the transmission unit applies the designated plurality of candidate start positions.

(Item 4)

The terminal as described in claim 1, wherein one or more sets each including a plurality of candidate start positions are pre-configured in the terminal, the control information includes information for designating a set, in the one or more sets, that the terminal applies, and the transmission unit applies a plurality of candidate start positions of the designated set.

(Item 5)

The terminal as described in any one of items 1-4, wherein when one set including a plurality of candidate start positions is designated to the terminal from the base station apparatus, the transmission unit applies the plurality of candidate start positions in each slot of the continuous slots, and when at least two sets each including a plurality of candidate start positions are designated to the terminal from the base station apparatus, the transmission unit applies either one of the at least two sets to a first slot of the continuous slots.

(Item 6)

The terminal as described in any one of items 1-5, wherein the transmission unit transmits, to the base station apparatus, capability information indicating whether the terminal supports operation to which the plurality of candidate start positions are applied.

According to any of the configurations described in items 1 to 6, a technique that enables the user terminal to perform efficient transmission while keeping LBT opportunities with an appropriate granularity.

<Hardware Configuration>

The block diagrams (FIGS. 14 and 15) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 16:
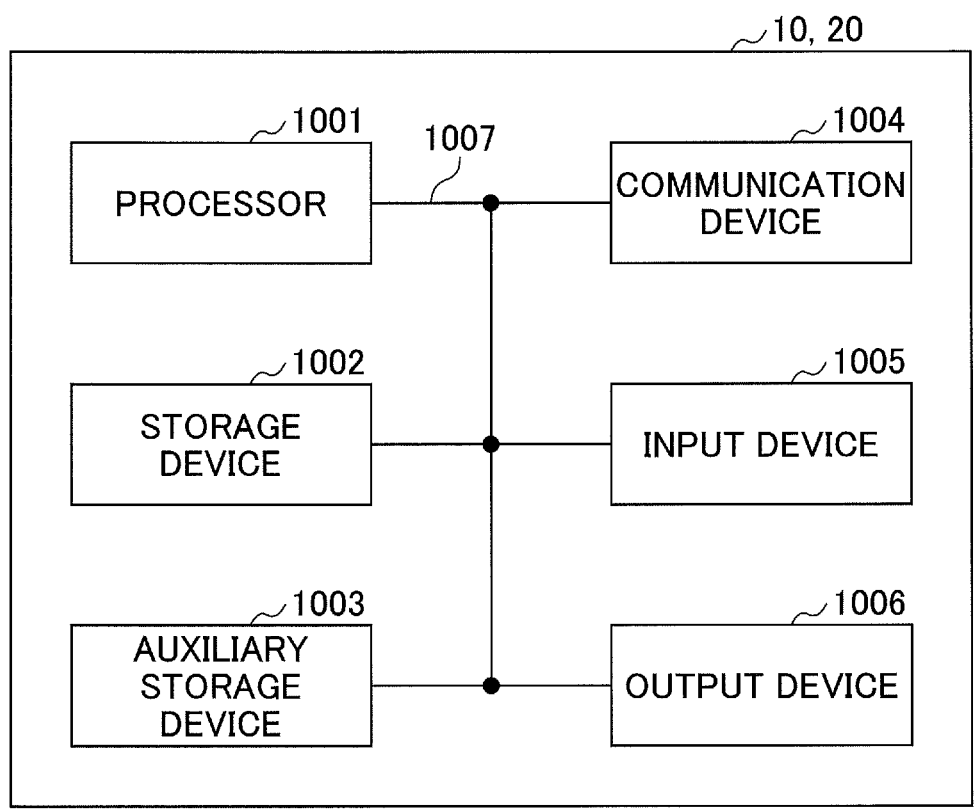
FIG. 16 is a diagram illustrating an example of a hardware configuration of a base station apparatus 10 or a user terminal 20 according to an embodiment of the present invention.

For example, the base station apparatus 10, the user terminal 20, and the like according to one embodiment of the present disclosure may function as a computer that performs processing of a wireless communication according to the present disclosure. FIG. 16 is a drawing illustrating an example of a hardware configuration of the base station apparatus 10 or the user terminal 20 according to an embodiment of the present disclosure. Each of the base station apparatus 10 and user terminal 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user terminal 20 may be configured to include one or more of the devices illustrated in drawings, or may be configured not to include some of the devices.

Each function of the base station apparatus 10 and the user terminal 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 9, may be implemented by a control program that is stored in the storage device 1002 and that is executed by the processor 1001. Also, for example, the control unit 240 of the user terminal 20, as illustrated in FIG. 10, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user terminal 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

<Supplements to Embodiment>

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user terminal 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user terminal 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user terminal. For example, each aspect or embodiment of the present disclosure may be applied to a configuration in which communication between a base station apparatus and a user terminal is replaced by communication between a plurality of user terminals 20 (that may be called D2D (Device-to-Device), V2X (Vehicle-to-Everything), or the like). In this case, a user terminal 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station apparatus. In this case, a base station apparatus may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like. Also, one slot may be called unit time. The unit time may be different for each cell according to a numerology.

A TTI means, for example, a minimum time unit of scheduling in radio communication. For example, in an LTE system, a base station performs scheduling for each user terminal 20 to assign, in TTI units, radio resources (such as frequency bandwidths, transmission power, and the like that can be used by each user terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the transmission unit 210 and the reception unit 220 are examples of communication units. The transmission unit 110 and the reception unit 120 are examples of communication units. UECpability Enquiry is an example of a first RRC message that queries the capabilities of a user terminal. UECpability Information is an example of a second RRC message reporting UE capabilities.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

DESCRIPTION OF SYMBOLS

10 base station apparatus
110 transmitting unit
120 receiving unit
130 setting unit
140 control unit
20 user terminal
210 transmitting unit
220 receiving unit
230 setting unit
240 control unit
1001 processor
1002 storage device
1003 auxiliary storage device
1004 communication device
1005 input device
1006 output device

The invention claimed is:

1. A terminal comprising:
    a reception unit configured to receive configuration information including a plurality of pieces of time domain assignment information each being related to a plurality of uplink data channels, and to receive control information including information that is represented by a bit length corresponding to a number of the plurality of pieces of time domain assignment information included in the configuration information, and a control unit configured to determine a time position of each of the plurality of uplink data channels based on time domain assignment information, in the configuration information, designated by the information, wherein the control unit determines whether or not to transmit a plurality of uplink channels based upon whether a type of the control information received by the reception unit is DCI format 0_1, and wherein a number of uplink data channels is notified by a number. of start time positions of uplink data channels, included in the time domain assignment information designated by the information.

2. The terminal as claimed in claim 1, wherein each of the plurality of pieces of time domain assignment information included in the configuration information includes a start time position of the plurality of uplink data channels.

3. A radio communication system comprising:
a terminal comprising:
a reception unit configured to receive configuration information including a plurality of pieces of time domain assignment information each being related to a plurality of uplink data channels, and to receive control information including information that is represented by a bit length corresponding to a number of the plurality of pieces of time domain assignment information included in the configuration information, and a control unit configured to determine a time position of each of the plurality of uplink data channels based on time domain assignment information, in the configuration information, designated by the information, wherein the control unit determines whether or not to transmit a plurality of uplink channels based upon whether a type of the control information received by the reception unit is DCI format 0_1, and wherein a number of uplink data channels is notified by a number, of start time positions of uplink data channels, included in the time domain assignment information designated by the information, and a base station comprising:
a transmission unit configured to transmit the control information.

4. A base station comprising:
a transmission unit configured to transmit, to a terminal, configuration information including a plurality of pieces of time domain assignment information each being related to a plurality of uplink data channels, and to transmit, to the terminal, control information including information that is represented by a bit length corresponding to a number of the plurality of pieces of time domain assignment information included in the configuration information, wherein a time position of each of the plurality of uplink data channels is determined by the terminal based on time domain assignment information, in the configuration information, designated by the information, the base station further comprising a reception unit configured to receive data transmitted by an uplink data channel of the time position that specifies whether or not to transmit a plurality of uplink channels based upon whether a type of the control information received by the reception unit is DCI format 0_1, and wherein a number of uplink data channels is notified by a number, of start time positions of uplink data channels, included in the time domain assignment information designated by the information.

5. A communication method executed by a terminal, the method comprising:
receiving configuration information including a plurality of pieces of time domain assignment information each being related to a plurality of uplink data channels, and receiving control information including information that is represented by a bit length corresponding to a number of the plurality of pieces of time domain assignment information included in the configuration information;

determining a time position of each of the plurality of uplink data channels based on time domain assignment information, in the configuration information, designated by the information; and determining whether or not to transmit a plurality of uplink channels based upon whether a type of the received control information is DCI format 0_1, wherein a number of uplink data channels is notified by a number, of start time positions of uplink data channels, included in the time domain assignment information designated by the information.

* * * * *